US012711928B2

(12) United States Patent
Watanabe

(10) Patent No.: US 12,711,928 B2
(45) Date of Patent: Aug. 18, 2026

(54) DISPLAY DEVICE THAT GENERATES A PIXEL SIGNAL BASED ON A PREDETERMINED GRADATION VALUE

(71) Applicant: Magnolia White Corporation, Tokyo (JP)

(72) Inventor: Yoshihiro Watanabe, Tokyo (JP)

(73) Assignee: MAGNOLIA WHITE CORPORATION, Tokyo (JP)

( * ) Notice: Subject to any disclaimer, the term of this patent is extended or adjusted under 35 U.S.C. 154(b) by 0 days.

(21) Appl. No.: 19/174,953

(22) Filed: Apr. 10, 2025

(65) Prior Publication Data

US 2025/0322808 A1 Oct. 16, 2025

(30) Foreign Application Priority Data

Apr. 15, 2024 (JP) ................................ 2024-065369

(51) Int. Cl.

*G09G 3/36* (2006.01)
*G09G 3/20* (2006.01)
*G09G 3/00* (2006.01)

(52) U.S. Cl.

CPC ......... *G09G 3/3648* (2013.01); *G09G 3/2007* (2013.01); *G09G 3/001* (2013.01); *G09G 2310/08* (2013.01); *G09G 2320/0233* (2013.01); *G09G 2320/0252* (2013.01); *G09G 2354/00* (2013.01); *G09G 2360/16* (2013.01)

(58) Field of Classification Search

CPC .... G09G 3/3648; G09G 3/2007; G09G 3/001; G09G 2310/08; G09G 2320/0233; G09G 2320/0252; G09G 2354/00; G09G 2360/16

See application file for complete search history.

(56) References Cited

U.S. PATENT DOCUMENTS

| | | | | |
|---|---|---|---|---|
| 2019/0066608 | A1* | 2/2019 | Watanabe | G09G 3/3607 |
| 2020/0035176 | A1* | 1/2020 | Ohhara | G09G 3/3648 |
| 2020/0302883 | A1 | 9/2020 | Watanabe | |
| 2022/0199050 | A1* | 6/2022 | Shigeta | G09G 3/3648 |
| 2025/0322808 | A1* | 10/2025 | Watanabe | G09G 3/3648 |

FOREIGN PATENT DOCUMENTS

| | | |
|---|---|---|
| JP | 2019-040036 A | 3/2019 |

* cited by examiner

*Primary Examiner* — David D Davis
(74) *Attorney, Agent, or Firm* — XSENSUS LLP

(57) ABSTRACT

According to an aspect, a display device includes pixels, scanning lines, signal lines, a first circuit to supply a gate signal to each scanning line, a second circuit to supply a pixel signal to each signal lines, and a third circuit to generate the pixel signal. Each pixel is reset by a predetermined gradation value before the pixel signal is supplied. The third circuit is configured to perform overdrive on some or all of the pixels. A magnitude of the difference between the gradation value of the pixel signal generated by the overdrive and the predetermined gradation value is larger for the pixel signal supplied to the pixel coupled to the scanning line supplied with the gate signal at a later timing in the scanning.

6 Claims, 27 Drawing Sheets

FIG.14

RESPONSE TIME [ms]

| | | ATTAINED GRADATION | | | | | | | | |
|---|---|---|---|---|---|---|---|---|---|---|
| | | 0 | 32 | 64 | 96 | 128 | 160 | 192 | 224 | 255 |
| START GRADATION | 0 | | 5.1 | 5.1 | 6.2 | 6.0 | 4.7 | 4.5 | 3.4 | 3.2 |
| | 32 | 4.3 | | 4.5 | 6.0 | 5.3 | 4.5 | 4.1 | 3.6 | 3.2 |
| | 64 | 2.8 | 3.8 | | 4.5 | 4.7 | 3.9 | 3.9 | 3.2 | 3.2 |
| | 96 | 2.6 | 3.2 | 4.7 | | 4.5 | 4.1 | 3.6 | 3.2 | 3.2 |
| | 128 | 2.4 | 3.0 | 3.9 | 4.5 | | 3.2 | 3.4 | 3.2 | 3.8 |
| | 160 | 2.6 | 3.0 | 3.4 | 3.4 | 4.7 | | 3.8 | 3.2 | 4.5 |
| | 192 | 2.6 | 2.8 | 3.2 | 3.2 | 3.8 | 3.9 | | 3.8 | 3.6 |
| | 224 | 2.4 | 2.8 | 3.2 | 3.4 | 3.8 | 3.6 | 4.1 | | 3.6 |
| | 255 | 2.6 | 2.8 | 3.2 | 3.2 | 3.8 | 4.5 | 3.8 | 4.9 | |

TAR

FIG.22

| L in | L out | | | | |
|---|---|---|---|---|---|
| | LUT5 | LUT4 | LUT3 | LUT2 | LUT1 |
| 0 | 0 | 0 | 0 | 0 | 0 |
| 1 | 8 | 6 | 4 | 4 | 4 |
| 2 | 17 | 12 | 9 | 8 | 8 |
| 3 | 25 | 18 | 14 | 12 | 12 |
| 4 | 34 | 24 | 19 | 17 | 16 |
| 5 | 42 | 30 | 24 | 21 | 20 |
| 6 | 51 | 36 | 29 | 25 | 24 |
| 7 | 59 | 42 | 34 | 30 | 28 |
| 8 | 67 | 48 | 39 | 34 | 32 |
| 9 | 75 | 54 | 44 | 38 | 36 |
| 10 | 84 | 60 | 49 | 43 | 40 |
| 11 | 92 | 67 | 54 | 47 | 44 |
| 250 | 1018 | 1017 | 1013 | 1007 | 1002 |
| 251 | 1019 | 1018 | 1015 | 1011 | 1006 |
| 252 | 1020 | 1019 | 1017 | 1014 | 1010 |
| 253 | 1021 | 1020 | 1019 | 1017 | 1014 |
| 254 | 1022 | 1022 | 1021 | 1020 | 1018 |
| 255 | 1023 | 1023 | 1023 | 1023 | 1023 |

FIG.24

| L in | L out | | | | |
|---|---|---|---|---|---|
| | LUT5 | LUT4 | LUT3 | LUT2 | LUT1 |
| 245 | 253 | 252 | 250 | 247 | 245 |
| 246 | 253 | 252 | 251 | 248 | 246 |
| 247 | 253 | 253 | 251 | 249 | 247 |
| 248 | 254 | 253 | 252 | 250 | 248 |
| 249 | 254 | 254 | 252 | 251 | 249 |
| 250 | 254 | 254 | 253 | 251 | 250 |
| 251 | 254 | 254 | 253 | 252 | 251 |
| 252 | 255 | 254 | 254 | 253 | 252 |
| 253 | 255 | 255 | 254 | 254 | 253 |
| 254 | 255 | 255 | 255 | 255 | 254 |
| 255 | 255 | 255 | 255 | 255 | 255 |

FIG.25

| L in | L out | | | | |
|---|---|---|---|---|---|
| | LUT5 | LUT4 | LUT3 | LUT2 | LUT1 |
| 245 | 1013 | 1010 | 1002 | 991 | 982 |
| 246 | 1014 | 1011 | 1004 | 994 | 986 |
| 247 | 1015 | 1013 | 1006 | 998 | 990 |
| 248 | 1016 | 1014 | 1009 | 1001 | 994 |
| 249 | 1017 | 1016 | 1011 | 1004 | 998 |
| 250 | 1018 | 1017 | 1013 | 1007 | 1002 |
| 251 | 1019 | 1018 | 1015 | 1011 | 1006 |
| 252 | 1020 | 1019 | 1017 | 1014 | 1010 |
| 253 | 1021 | 1020 | 1019 | 1017 | 1014 |
| 254 | 1022 | 1022 | 1021 | 1020 | 1018 |
| 255 | 1023 | 1023 | 1023 | 1023 | 1023 |

FIG.27

| L in | L out | |
|---|---|---|
| | LUA | LUB |
| 240 | 1008 | 1020 |
| 241 | 1009 | 1020 |
| 242 | 1010 | 1021 |
| 243 | 1011 | 1021 |
| 244 | 1012 | 1021 |
| 245 | 1013 | 1021 |
| 246 | 1014 | 1022 |
| 247 | 1015 | 1022 |
| 248 | 1016 | 1022 |
| 249 | 1017 | 1022 |
| 250 | 1018 | 1022 |
| 251 | 1019 | 1022 |
| 252 | 1020 | 1022 |
| 253 | 1021 | 1022 |
| 254 | 1022 | 1022 |
| 255 | 1023 | 1023 |

DISPLAY DEVICE THAT GENERATES A PIXEL SIGNAL BASED ON A PREDETERMINED GRADATION VALUE

CROSS-REFERENCE TO RELATED APPLICATION

This application claims the benefit of priority from Japanese Patent Application No. 2024-065369, filed on Apr. 15, 2024, the entire contents of which are incorporated herein by reference.

BACKGROUND

1. Technical Field

What is disclosed herein relates to a display device.

2. Description of the Related Art

As disclosed in Japanese Patent Application Laid-open Publication No. 2019-40036 (JP-A-2019-40036), there have been known display devices that perform overdrive to increase the response speed in driving a liquid crystal. To perform the overdrive described in JP-A-2019-40036, it is necessary to supply each pixel with a gradation value corresponding to the difference in the gradation value of the pixel between the latest image to be displayed and the image previous thereto. Therefore, the display device that performs the overdrive described in JP-A-2019-40036 requires a storage area to store therein the previous image, resulting in a higher cost due to the storage device that provides such a storage area. It is complicated to control the gradation value according to the difference in the gradation value of each pixel between the latest image and the previous image, and there has been a demand for a display device that can perform overdrive with a simpler mechanism.

For the foregoing reasons, there is a need for a display device that can perform overdrive with a simpler mechanism and at a lower cost.

SUMMARY

According to an aspect, a display device includes: a plurality of pixels; a plurality of scanning lines each of which is coupled to more than one of the pixels arrayed along a first direction; a plurality of signal lines each of which is coupled to more than one of the pixels arrayed along a second direction intersecting the first direction; a first circuit configured to supply a gate signal to each of the scanning lines; a second circuit configured to supply a pixel signal to each of the signal lines; and a third circuit configured to generate the pixel signal according to image data. Each pixel is configured to be supplied with the pixel signal in response to a timing of driving a switching element driven in accordance with the gate signal. Each pixel is configured to be reset by a reset signal corresponding to a predetermined gradation value before the pixel signal is supplied. The first circuit is configured to perform scanning in which a timing of supplying the gate signal differs between the scanning lines when the pixel signal is supplied to each pixel. The third circuit is configured to perform overdrive on some or all of the pixels. The overdrive is processing of using a difference between a gradation value indicated by pixel data included in the image data and the predetermined gradation value as a reference value and generating the pixel signal corresponding to a gradation value the difference of which from the predetermined gradation value is larger than the reference value. A magnitude of the difference between the gradation value of the pixel signal generated by the overdrive and the predetermined gradation value is larger for the pixel signal supplied to the pixel coupled to the scanning line supplied with the gate signal at a later timing in the scanning.

BRIEF DESCRIPTION OF THE DRAWINGS

FIG. 14 is a table illustrating the response time of the pixel Pix determined by the relation between the gradation value indicated by the pixel signal before the update and the gradation value indicated by the pixel signal after the update;

FIG. 22 is a diagram of an example of the contents of lookup tables LUT1, LUT2, LUT3, LUT4, and LUT5 when the pixel signal indicating a gradation value of "0" is employed as a predetermined pixel signal;

FIG. 24 is a diagram of "L out" in the range where "L in" is equal to or larger than 245 when the number of bits is not expanded;

FIG. 25 is a diagram of "L out" in the range where "L in" is equal to or larger than 245 when the number of bits is expanded;

FIG. 27 is a diagram of "L out" in the range where "L in" is equal to or larger than 240 in the relation between "L in" and "L out" in the lookup tables LUA and LUB illustrated in FIG. 26.

DETAILED DESCRIPTION

Figure 1:
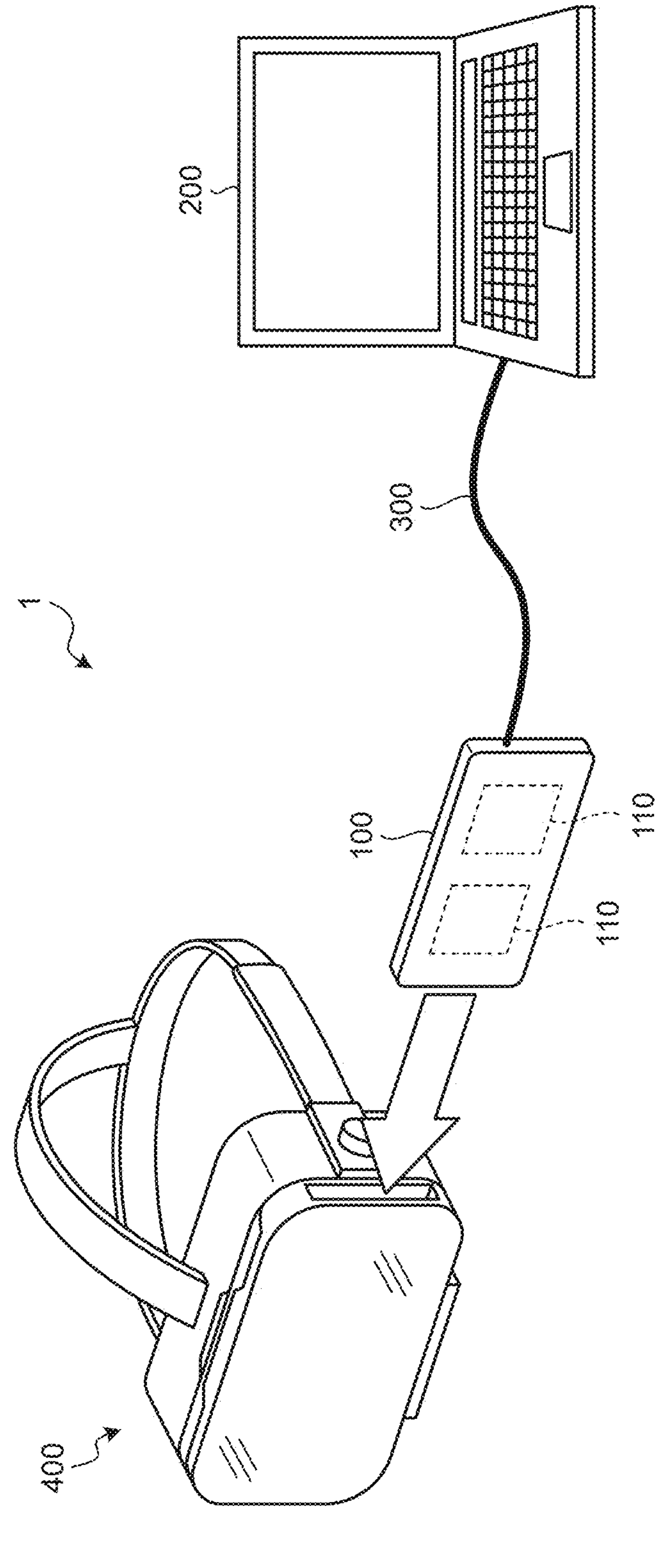
FIG. 1 is a configuration diagram of an example of a display system according to an embodiment.

An exemplary embodiment of the present disclosure is described below with reference to the accompanying drawings. What is disclosed herein is given by way of example only, and appropriate modifications made without departing from the spirit of the invention and easily conceivable by those skilled in the art naturally fall within the scope of the present disclosure. To simplify the explanation, the drawings may possibly illustrate the width, the thickness, the shape, and other elements of each component more schematically than the actual aspect. These elements, however, are given by way of example only and are not intended to limit interpretation of the present disclosure. In the present specification and the figures, components similar to those previously described with reference to previous figures are denoted by the same reference numerals, and detailed explanation thereof may be appropriately omitted.

Figure 2:
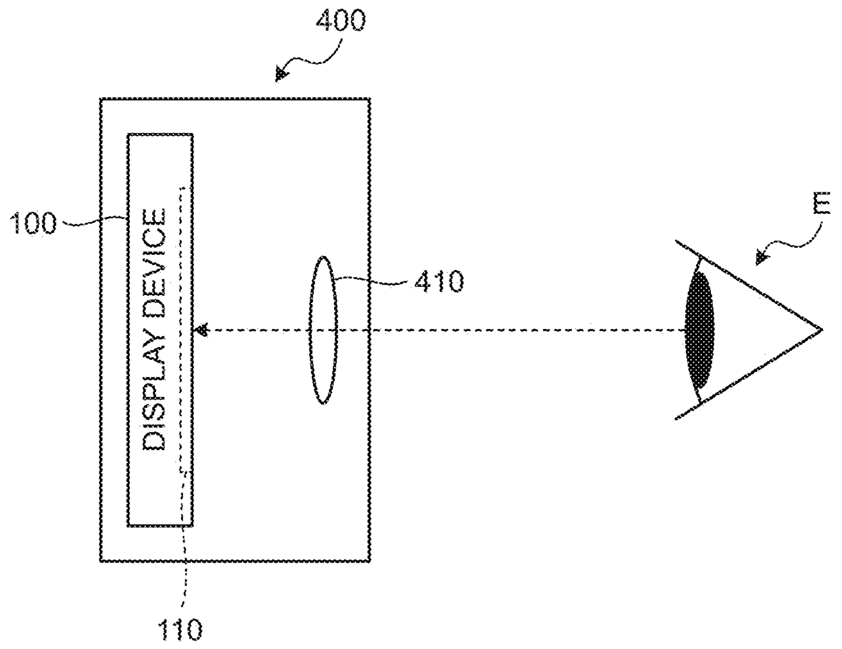
FIG. 2 is a schematic diagram of an example of the relative relation between a display panel and the eyes of a user.

FIG. 1 is a configuration diagram of an example of a display system according to an embodiment. FIG. 2 is a schematic diagram of an example of the relative relation between a display panel and the eyes of a user. A display system 1 according to the present embodiment is a display system that changes images in synchronization with movement of the user. The display system 1 is, for example, a virtual reality (VR) system that three-dimensionally displays VR images of three-dimensional objects or the like in a virtual space and changes the three-dimensional images depending on changes of the orientation (position) of the user's head, thereby providing a sense of virtual reality to the user.

As illustrated in FIG. 1, the display system 1 includes a display device 100 and an image generation device 200, for example. The display device 100 and the image generation device 200 are wired together by a cable 300, for example. Examples of the cable 300 include, but are not limited to, a universal serial bus (USB) cable, a high-definition multimedia interface (HDMI) (registered trademark) cable, etc. The display device 100 and the image generation device 200 may be coupled through wireless communications.

The display device 100 according to the present disclosure is used as a head-mounted display device fixed to a wearable member 400 and worn on the user's head, for example. The display device 100 includes display panels 110 for displaying images generated by the image generation device 200. In the following description, the form in which the display device 100 is fixed to the wearable member 400 is also referred to as a "head-mounted display (HMD)".

The image generation device 200 according to the present disclosure is an electronic apparatus, such as a personal computer and a gaming device. The image generation device 200 generates VR images according to the position and posture of the user's head and outputs them to the display device 100. The images generated by the image generation device 200 are not limited to VR images.

The display device 100 is fixed at such a position that the display panels 110 are placed in front of the user's eyes when the user wears the HMD. Besides the display panels 110, the display device 100 may include audio output devices, such as speakers, at positions corresponding to the user's ears when the user wears the HMD. The display device 100 may also include a sensor (e.g., a gyro sensor, an acceleration sensor, and an orientation sensor), which will be described later, to detect the position, posture, or the like of the head of the user wearing the display device 100. The display device 100 may also have the functions of the image generation device 200.

As illustrated in FIG. 2, the wearable member 400 includes a lens 410 corresponding to two eyes E, for example. The lens 410 magnifies an image displayed on the display panel 110 and forms the image on the user's eye E when the user wears the HMD. The user visually recognizes the image displayed on the display panel 110 and magnified by the lens 410. While FIG. 2 illustrates an example where one lens is placed between the user's eye E and the display panel 110, a plurality of lenses may be provided corresponding to the respective eyes of the user, for example. The display panels 110 may be placed at another position instead of in front of the user's eyes.

The present embodiment assumes that the display panel 110 is a liquid crystal display panel of the lateral electric field mode, such as in-plane switching (IPS) including fringe field switching (FFS) provided with video liquid crystal elements.

In the display device 100 used in the VR system illustrated in FIG. 1, the image displayed on the display panel 110 is magnified and formed in the user's eye E as illustrated in FIG. 2. Therefore, a higher definition display panel is required. Magnifying the displayed video makes the gap between the pixels more likely to be visually recognized as a grid-like pattern. Therefore, by using a liquid crystal display panel with a high pixel aperture ratio, video can be displayed such that a grid-like pattern is less likely to be recognized.

Figure 3:
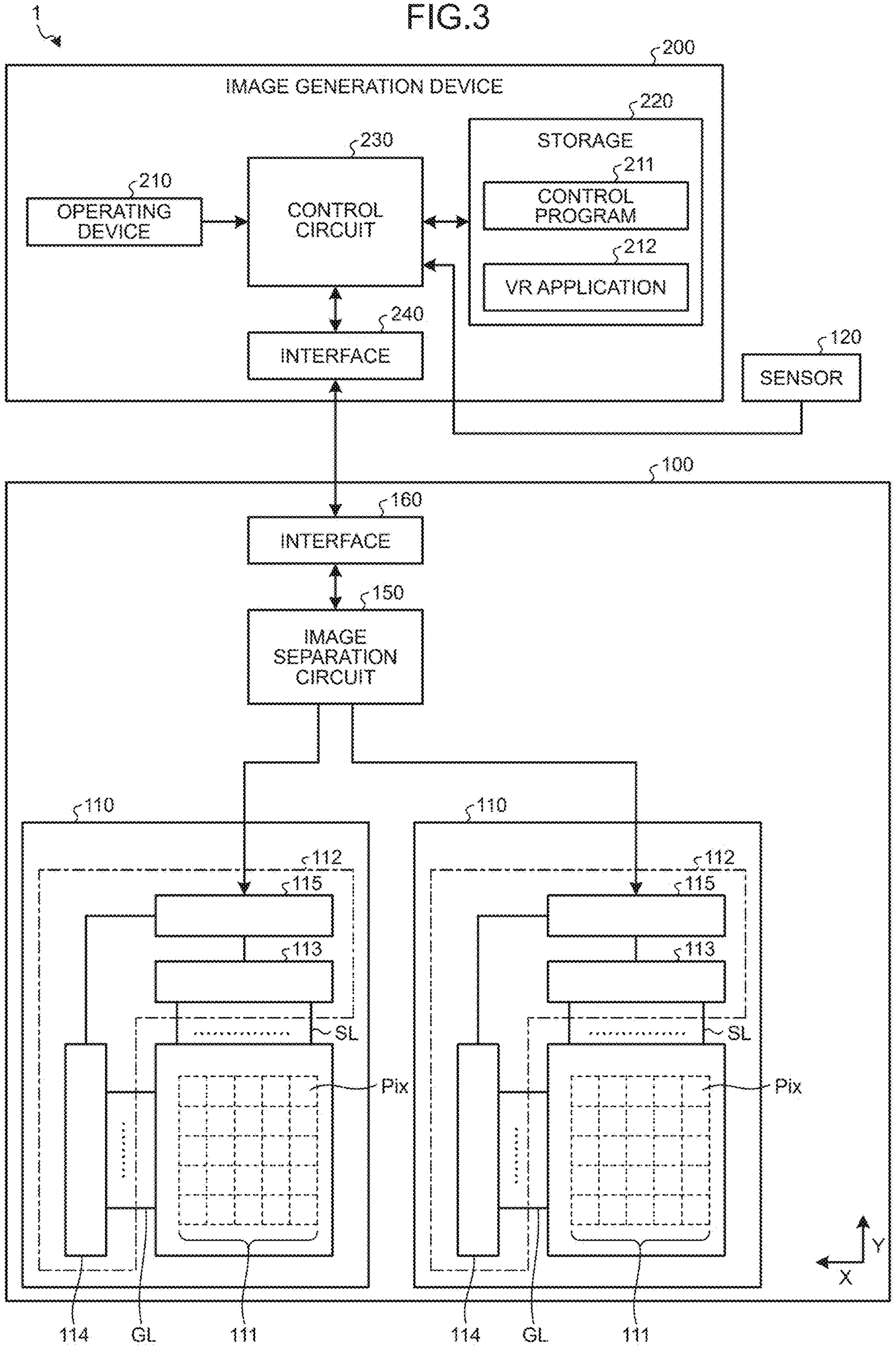
FIG. 3 is a block diagram of an example of the configurations of an image generation device and a display device in the display system illustrated in FIG. 1.

FIG. 3 is a block diagram of an example of the configurations of the image generation device and the display device in the display system illustrated in FIG. 1. As illustrated in FIG. 3, the display device 100 includes two display panels 110, a sensor 120, an image separation circuit 150, and an interface 160.

The display device 100 includes two display panels 110. One of the two display panels 110 is used as the display panel 110 for the left eye, and the other is used as the display panel 110 for the right eye.

The two display panels 110 each have a display region 111 and a display control circuit 112. The display panel 110 includes a light source device, not illustrated, that irradiates the display region 111 with light from behind.

In the display region 111, $P_0 \times Q_0$ pixels Pix ($P_0$ pixels Pix in the row direction (X-direction) and $Q_0$ pixels Pix in the column direction (Y-direction)) are arrayed in a two-dimensional matrix (row-column configuration). The pixel density in the display region 111 according to the present embodiment is 806 ppi, for example. FIG. 3 schematically illustrates the array of the pixels Pix, and the array of the pixels Pix will be described later in greater detail.

The display panel 110 includes scanning lines extending in an X-direction and signal lines extending in a Y-direction that intersects the X-direction. In the display panel 110, the region surrounded by the signal lines SL and the scanning lines GL is provided with the pixel Pix. The pixel Pix includes a switching element (thin-film transistor (TFT)) coupled to the signal line SL and the scanning line GL, and a pixel electrode coupled to the switching element. One scanning line GL is coupled to a plurality of pixels Pix disposed along the extending direction of the scanning line GL. One signal line SL is coupled to a plurality of pixels Pix disposed along the extending direction of the signal line SL.

The display region 111 of one display panel 110 of the two display panels 110 is for the right eye, and the display region 111 of the other display panel 110 is for the left eye. While the display panels 110 herein are two display panels 110, one for the left eye and the other for the right eye, the display device 100 does not necessarily include two display panels 110. For example, one display panel 110 may be provided, and the display region of the display panel 110 may be divided into two parts such that the right half region displays images for the right eye and the left half region displays images for the left eye.

The display control circuit 112 includes a driver integrated circuit (IC) 115, a signal line coupling circuit 113, and a scanning line drive circuit 114. The signal line coupling circuit 113 is electrically coupled to the signal lines SL. The driver IC 115 causes the scanning line drive circuit 114 to control ON/OFF of the switching elements (e.g., TFT) for controlling the operation (light transmittance) of the pixels Pix. The scanning line drive circuit 114 is electrically coupled to the scanning lines GL.

The sensor 120 detects information that enables determination of the orientation of the user's head. The sensor 120, for example, detects information indicating the movement of the display device 100, and the display system 1 determines the orientation of the head of the user wearing the display device 100 on the head based on the information indicating the movement of the display device 100.

The sensor 120 detects the information that enables determination of the orientation of the HMD using at least one of the angle, acceleration, angular velocity, azimuth, and distance of the display device 100, for example. Examples of the sensor 120 include, but are not limited to, a gyro sensor, an acceleration sensor, an azimuth sensor, etc. The sensor 120 may detect the angle and angular velocity of the display device 100 by a gyro sensor, for example. The sensor 120 may detect the direction and magnitude of acceleration acting on the display device 100 by an acceleration sensor, for example.

The sensor 120 may detect the azimuth of the display device 100 by an azimuth sensor, for example. The sensor 120 may detect the movement of the display device 100 by a distance sensor or a global positioning system (GPS) receiver, for example. The sensor 120 may be any other sensor, such as an optical sensor, or a combination of a plurality of sensors, as long as it is a sensor that detects the orientation of the user's head, changes in the line of sight, movement, or the like. As illustrated in FIG. 3, for example, the sensor 120 is electrically coupled to a control circuit 230. Signals indicating the results of detection by the sensor 120 are output to the control circuit 230.

The image separation circuit 150 receives image data for the left eye and image data for the right eye transmitted from the image generation device 200 via the cable 300. The image separation circuit 150 transmits the image data for the left eye to the display panel 110 that displays images for the left eye and transmits the image data for the right eye to the display panel 110 that displays images for the right eye. Image data (e.g., image data DP3 illustrated in FIG. 17 described below) from which the pixel signals are generated by the driver IC 115 is the image data for the left eye or the image data for the right eye, which will be described later.

The interface 160 includes a connector to which the cable 300 (FIG. 1) is coupled. The interface 160 receives signals from the image generation device 200 via the coupled cable 300. The signals received from the sensor 120 may be output to the control circuit 230 of the image generation device 200 via the interface 160 and an interface 240. The interface 160 may be a wireless communication device, for example, and transmit and receive information to and from the image generation device 200 through wireless communications.

The image generation device 200 includes an operating device 210, a storage 220, the control circuit 230, and the interface 240.

The operating device 210 receives operations of the user. The operating device 210 is an input device, such as a keyboard, buttons, and a touch screen. The operating device 210 is electrically coupled to the control circuit 230. The operating device 210 outputs information corresponding to the operations to the control circuit 230.

The storage 220 stores therein computer programs and data. The storage 220 temporarily stores therein the results of processing by the control circuit 230. The storage 220 includes a storage medium. Examples of the storage medium include, but are not limited to, ROM, RAM, a memory card, an optical disc, a magneto-optical disc, etc. The storage 220 may store therein data of images to be displayed on the display device 100.

The storage 220 stores therein a control program 211 and a VR application 212, for example. The control program 211 can implement functions related to various controls for operating the image generation device 200, for example. The VR application 212 can implement functions to display VR images on the display device 100. The storage 220, for example, can store therein various kinds of information, such as data indicating the detection results of the sensor 120, received from the display device 100.

Examples of the control circuit 230 include, but are not limited to, a micro control unit (MCU), a central processing unit (CPU), etc. The control circuit 230 can collectively control the operations of the image generation device 200. The various functions of the control circuit 230 are implemented based on the control by the control circuit 230.

The control circuit 230 includes a graphics processing unit (GPU) that generates images to be displayed, for example. The GPU generates images to be displayed on the display device 100. The control circuit 230 outputs the images generated by the GPU to the display device 100 via the interface 240. While the control circuit 230 of the image generation device 200 according to the present embodiment includes a GPU, the present embodiment is not limited thereto. For example, the GPU may be provided in the display device 100 or the image separation circuit 150 of the display device 100. In this case, the display device 100 acquires data from the image generation device 200 or an external electronic apparatus, for example, and the GPU generates the images based on the data.

The interface 240 includes a connector to which the cable 300 (refer to FIG. 1) is coupled. The interface 240 receives signals from the display device 100 via the cable 300. The interface 240 outputs signals received from the control circuit 230 to the display device 100 via the cable 300. The interface 240 may be a wireless communication device, for example, and may transmit and receive information to and from the display device 100 through wireless communications.

When the control circuit 230 executes the VR application 212, it displays images corresponding to the movement of the user (display device 100) on the display device 100. When the control circuit 230 detects a change in the user (display device 100) while an image is being displayed on the display device 100, the control circuit 230 changes the image being displayed on the display device 100 to an image in the direction of the change. When starting to generate an image, the control circuit 230 generates an image based on a reference point of view and a reference line of sight in the virtual space. When the control circuit 230 detects a change in the user (display device 100), the control circuit 230 changes the point of view or the line of sight for generating the image to be displayed, from the reference point view or the reference line of sight to the point view or the line of sight corresponding to the movement of the user (display device 100). The control circuit 230 displays, on the display device 100, an image based on the changed point of view or line of sight.

For example, the control circuit 230 detects the movement of the user's head to the right direction based on the detection results of the sensor 120. In this case, the control circuit 230 changes the currently displayed image to an image obtained when the line of sight is moved to the right direction. The user can visually recognize the image in the right direction with respect to the image being displayed on the display device 100.

When the control circuit 230 detects the movement of the display device 100 based on the detection results of the sensor 120, for example, the control circuit 230 changes the image according to the detected movement. If the control circuit 230 detects that the display device 100 has moved forward, the control circuit 230 changes the currently displayed image to an image to be displayed when the display device 100 moves forward. If the control circuit 230 detects that the display device 100 has moved backward, the control circuit 230 changes the currently displayed image to an image to be displayed when the display device 100 moves backward. The user can visually recognize the image corresponding to the direction of his/her movement from the image being displayed on the display device 100.

Figure 4:
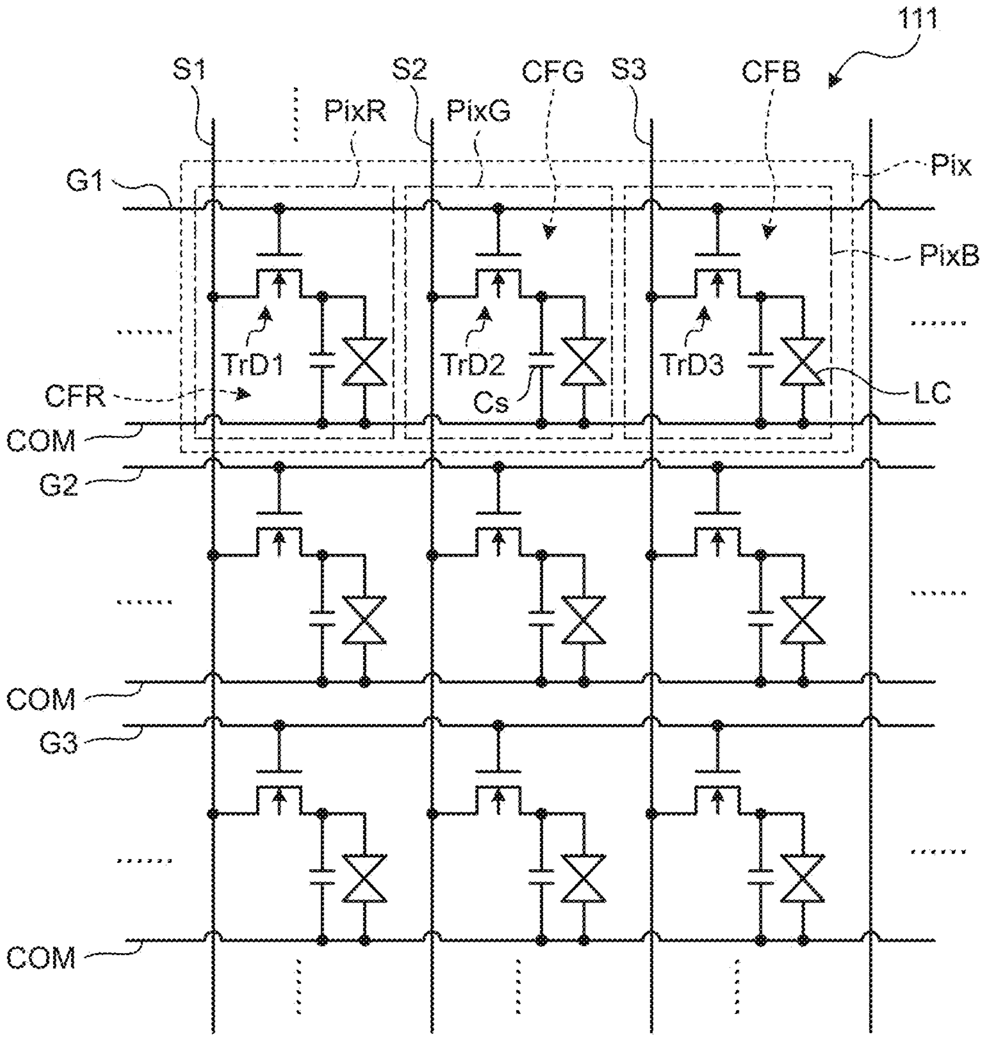
FIG. 4 is a circuit diagram of a display region according to the embodiment.

FIG. 4 is a circuit diagram of the display region according to the embodiment. In the following description, the scanning lines GL described above collectively refer to a plurality of scanning lines G1, G2, and G3. The signal lines SL described above collectively refer to a plurality of signal lines S1, S2, and S3. While the scanning lines GL and the signal lines SL are orthogonal to each other in the example illustrated in FIG. 4, the present embodiment is not limited thereto. For example, the scanning lines GL and the signal lines SL are not necessarily orthogonal to each other.

As illustrated in FIG. 4, the pixel Pix according to the present disclosure includes, for example, a pixel PixR for displaying red (first color: R), a pixel PixG for displaying green (second color: G), and a pixel PixB for displaying blue (third color: B). The display region 111 is provided with switching elements TrD1, TrD2, and TrD3 of the pixels PixR, PixG, and PixB, the signal lines SL, the scanning lines GL, and other components. The signal lines S1, S2, and S3 are wiring for supplying pixel signals to pixel electrodes PE1, PE2, and PE3 (refer to FIG. 6). The scanning lines G1, G2, and G3 are wiring for supplying gate signals that drive the switching elements TrD1, TrD2, and TrD3. The pixel signal is a signal generated by the driver IC 115 based on the image data input to the display panel 110. With the pixel signal, the orientation of the liquid crystal molecules LM at the positions of the pixel PixR, the pixel PixG, and the pixel PixB in each pixel Pix is determined. In other words, with the pixel signal, the degree of transmission of light from a backlight at the position of each pixel Pix is determined. In other words, the pixel signal is generated such that the image to be displayed according to the image data can be reproduced by the display output by the display panel 110.

The pixels PixR, PixG, and PixB include the switching elements TrD1, TrD2, and TrD3, respectively, and a capacitor of a liquid crystal layer LC. The switching elements TrD1, TrD2, and TrD3 are composed of a thin-film transistor and are composed of an n-channel metal oxide semiconductor (MOS) TFT in this example. A sixth insulating film 16 (refer to FIG. 6) is provided between a common electrode COM and the pixel electrodes PE1, PE2, and PE3, which will be described later, and a holding capacitor Cs illustrated in FIG. 4 is formed by them.

Color filters CFR, CFG, and CFB illustrated in FIG. 4 are provided such that color regions colored in three colors of red (first color: R), green (second color: G), and blue (third color: B), for example, are periodically arrayed. The three color regions R, G, and B correspond to the pixels PixR, PixG, and PixB as one set illustrated in FIG. 4 described above. A set of the pixels PixR, PixG, and PixB corresponding to the three color regions serves as one pixel Pix. The color filter may include four or more color regions.

Figure 5:
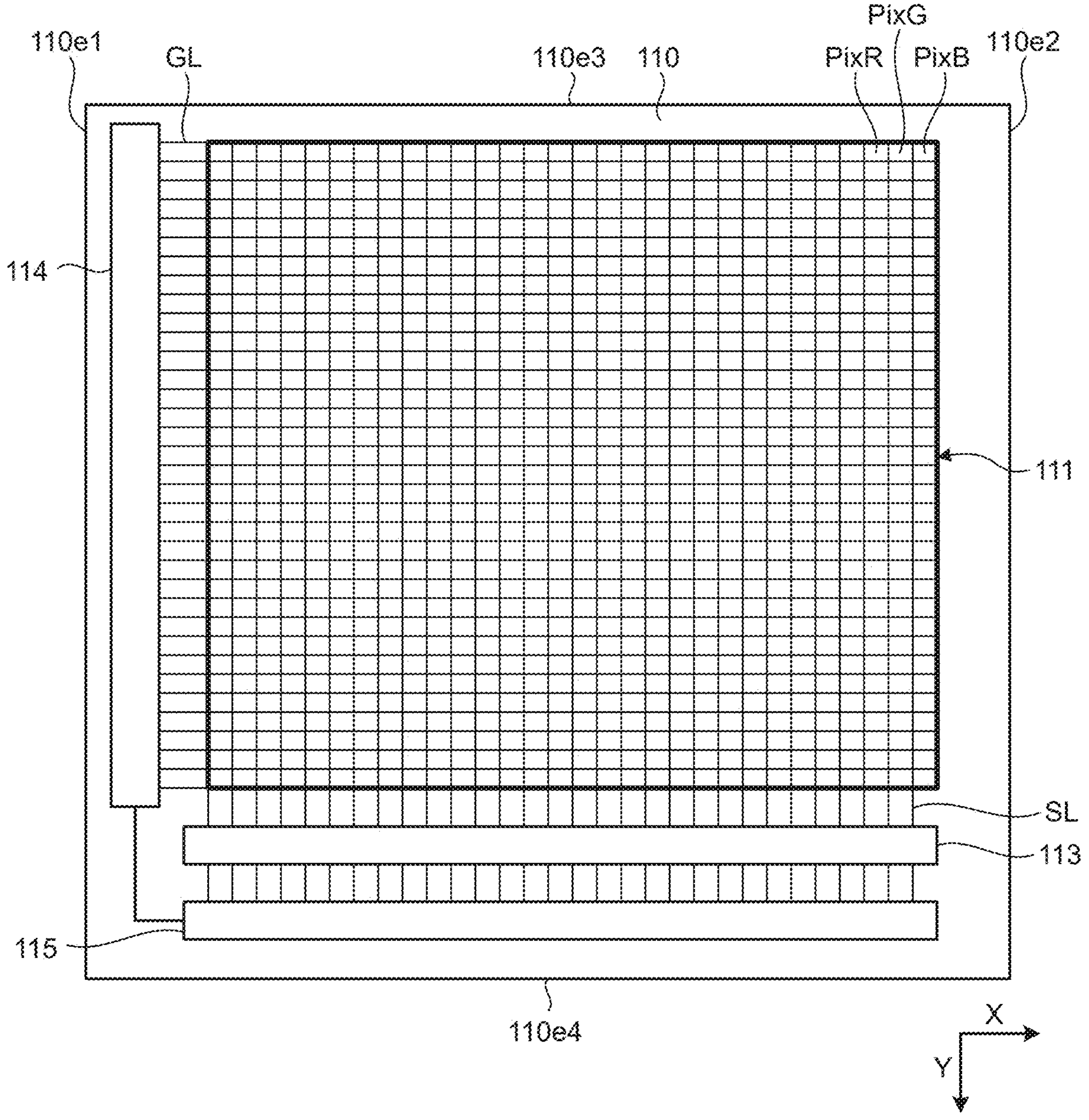
FIG. 5 is a schematic of an example of the display panel according to the embodiment.
Figure 6:
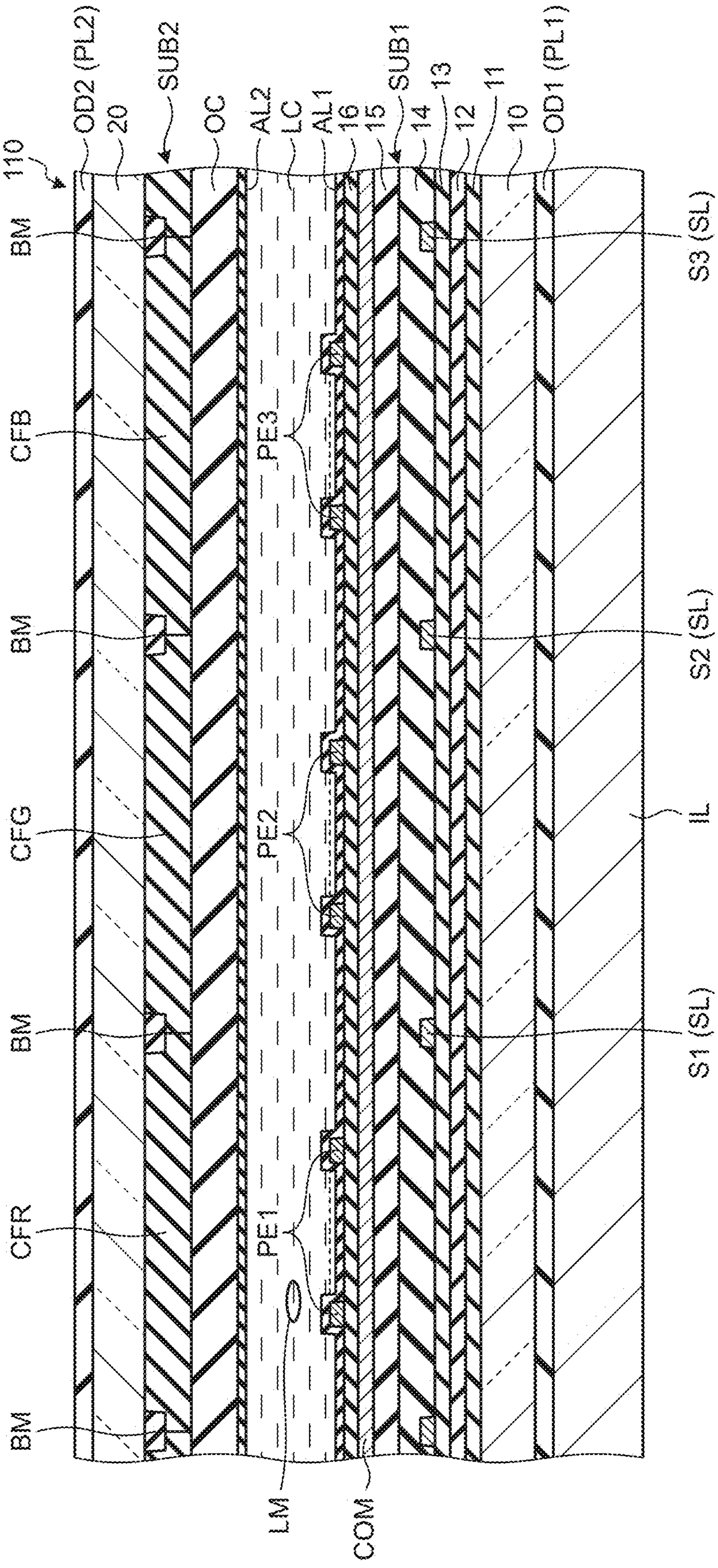
FIG. 6 is a sectional view schematically illustrating a section of the display panel according to the embodiment.

FIG. 5 is a schematic of an example of the display panel according to the embodiment. FIG. 6 is a sectional view schematically illustrating a section of the display panel according to the embodiment.

As illustrated in FIG. 5, the display panel 110 has sides **110*e*1, 110*e*2, 110*e*3, and 110*e*4 at the ends of the substrate. The region between the display region 111 and the sides 110*e*1, 110*e*2, 110*e*3, and 110*e*4** at the ends of the substrate of the display panel is referred to as a peripheral region.

The scanning line drive circuit 114 is disposed in the peripheral region between the side **110*e*1 at the end of the substrate of the display panel 110 and the display region 111. The signal line coupling circuit 113 is disposed in the peripheral region between the side 110*e*4 at the end of the substrate of the display panel 110 and the display region 111. The driver IC 115 is disposed in the peripheral region between the side 110*e*4 at the end of the substrate of the display panel 110 and the display region 111. The sides 110*e*3 and 110*e*4 at the ends of the substrate of the display panel 110 according to the present embodiment are parallel to the X-direction. The sides 110*e*1 and 110*e*2 at the ends of the substrate of the display panel 110** are parallel to the Y-direction.

In the example illustrated in FIG. 5, the signal lines SL extend parallel to the Y-direction, and the scanning lines GL extend parallel to the X-direction. As illustrated in FIG. 5, in the present disclosure, the direction in which the scanning lines GL extend is orthogonal to the direction in which the signal lines SL extend. Therefore, the pixels PixR, PixG, and PixB have a rectangular shape, for example. While the pixels PixR, PixG, and PixB have a rectangular shape in the example illustrated in FIG. 5, they do not necessarily have a rectangular shape. For example, the pixels PixR, PixG, and PixB may have a parallelogrammatic shape. The pixels PixR, PixG, and PixB may be referred to as pixels PixS.

Next, the sectional structure of the display panel 110 is described with reference to FIG. 6. In FIG. 6, an array substrate SUB1 is formed using a first insulating substrate 10 having a light-transmitting property, such as a glass or resin substrate, as a base. The array substrate SUB1 includes a first insulating film 11, a second insulating film 12, a third insulating film 13, a fourth insulating film 14, a fifth insulating film 15, a sixth insulating film 16, the signal lines S1 to S3, the pixel electrodes PE1 to PE3, the common electrode COM, a first orientation film AL1, and other components on the surface of the first insulating substrate 10 facing a counter substrate SUB2. In the following description, the direction from the array substrate SUB1 toward the counter substrate SUB2 is referred to as an upper side or simply as up.

The first insulating film 11 is positioned on the first insulating substrate 10. The second insulating film 12 is positioned on the first insulating film 11. The third insulating film 13 is positioned on the second insulating film 12. The signal lines S1 to S3 are positioned on the third insulating film 13. The fourth insulating film 14 is positioned on the third insulating film 13 and covers the signal lines S1 to S3.

Wiring may be disposed on the fourth insulating film 14 if necessary. The wiring is covered by the fifth insulating film 15. In the present embodiment, the wiring is not provided. The first insulating film 11, the second insulating film 12, the third insulating film 13, and the sixth insulating film 16 are made of light-transmitting inorganic material, such as silicon oxide and silicon nitride. The fourth insulating film 14 and the fifth insulating film 15 are made of light-transmitting resin material and thicker than the other insulating films made of inorganic material. The fifth insulating film 15, however, may be made of inorganic material.

The common electrode COM is positioned on the fifth insulating film 15. The common electrode COM is covered by the sixth insulating film 16. The sixth insulating film 16 is made of light-transmitting inorganic material, such as silicon oxide and silicon nitride.

The pixel electrodes PE1 to PE3 are positioned on the sixth insulating film 16 and face the common electrode COM with the sixth insulating film 16 interposed therebetween. The pixel electrodes PE1 to PE3 and the common electrode COM are made of light-transmitting conductive material, such as indium tin oxide (ITO) and indium zinc oxide (IZO). The pixel electrodes PE1 to PE3 are covered by the first orientation film AL1. The first orientation film AL1 also covers the sixth insulating film 16.

The counter substrate SUB2 is formed using a second insulating substrate 20 having a light-transmitting property, such as a glass or resin substrate, as a base. The counter substrate SUB2 includes a light-shielding layer BM, the color filters CFR, CFG, and CFB, an overcoat layer OC, and a second orientation film AL2 on the surface of the second insulating substrate 20 facing the array substrate SUB1.

As illustrated in FIG. 6, the light-shielding layer BM is positioned on the surface of the second insulating substrate 20 facing the array substrate SUB1. The light-shielding layer BM defines the size of openings facing the respective pixel electrodes PE1 to PE3. The light-shielding layer BM is made of black resin material or light-shielding metal material.

The color filters CFR, CFG, and CFB are positioned on the surface of the second insulating substrate 20 facing the array substrate SUB1 with their ends overlapping the light-shielding layer BM. The color filter CFR faces the pixel electrode PE1. The color filter CFG faces the pixel electrode PE2. The color filter CFB faces the pixel electrode PE3. For example, the color filters CFR, CFG, and CFB are made of resin material colored in red, green, and blue, respectively.

The overcoat layer OC covers the color filters CFR, CFG, and CFB. The overcoat layer OC is made of light-transmitting resin material. The second orientation film AL2 covers the overcoat layer OC. The first orientation film AL1 and the second orientation film AL2 are made of material having a horizontal orientation property, for example.

As described above, the counter substrate SUB2 includes the light-shielding layer BM, the color filters CFR, CFG, and CFB, and other components. The light-shielding layer BM is disposed in the region facing the wiring parts, such as the scanning lines G1, G2, and G3, the signal lines S1, S2, and S3, contact parts PA1, PA2, and PA3, and the switching elements TrD1, TrD2, and TrD3 illustrated in FIG. 4.

While the counter substrate SUB2 includes the three color filters CFR, CFG, and CFB in FIG. 6, it may include four or more color filters in colors different from blue, red, and green, that is, in white, transparent, yellow, magenta, and cyan, for example. The color filters CFR, CFG, and CFB may be provided to the array substrate SUB1.

While the color filters CF are provided to the counter substrate SUB2 in FIG. 6, the display panel 110 may have what is called a color filter on array (COA) structure in which the color filters CF are provided to the array substrate SUB1.

The array substrate SUB1 and the counter substrate SUB2 are disposed with the first orientation film AL1 and the second orientation film AL2 facing each other. The liquid crystal layer LC is interposed between the first orientation film AL1 and the second orientation film AL2. The liquid crystal layer LC is made of negative liquid crystal material with negative dielectric anisotropy or positive liquid crystal material with positive dielectric anisotropy.

The array substrate SUB1 faces a backlight unit IL, and the counter substrate SUB2 is positioned on the display surface side. While various kinds of backlight units IL are applicable, detailed description of their structure is omitted.

A first optical element OD1 including a first polarizing plate PL1 is disposed on the outer surface of the first insulating substrate 10 or the surface facing the backlight unit IL. A second optical element OD2 including a second polarizing plate PL2 is disposed on the outer surface of the second insulating substrate 20 or the surface on the viewing position side. The first polarization axis of the first polarizing plate PL1 and the second polarization axis of the second polarizing plate PL2 are in a crossed-Nicoles positional relation in the X-Y plane, for example. The first optical element OD1 and the second optical element OD2 may include other optical functional elements, such as a retardation plate.

For example, when the liquid crystal layer LC is made of negative liquid crystal material and no voltage is applied to the liquid crystal layer LC, the liquid crystal molecules LM are initially oriented with their long axis along the X-direction in the X-Y plane. In contrast to this, when voltage is applied to the liquid crystal layer LC, that is, in an ON state where an electric field is generated between the common electrode COM and the pixel electrodes PE1 to PE3, the liquid crystal molecules LM are affected by the electric field, and their orientation state changes. In the ON state, the polarization state of incident linearly polarized light changes depending on the orientation state of the liquid crystal molecules LM as the linearly polarized light passes through the liquid crystal layer LC.

Figure 7:
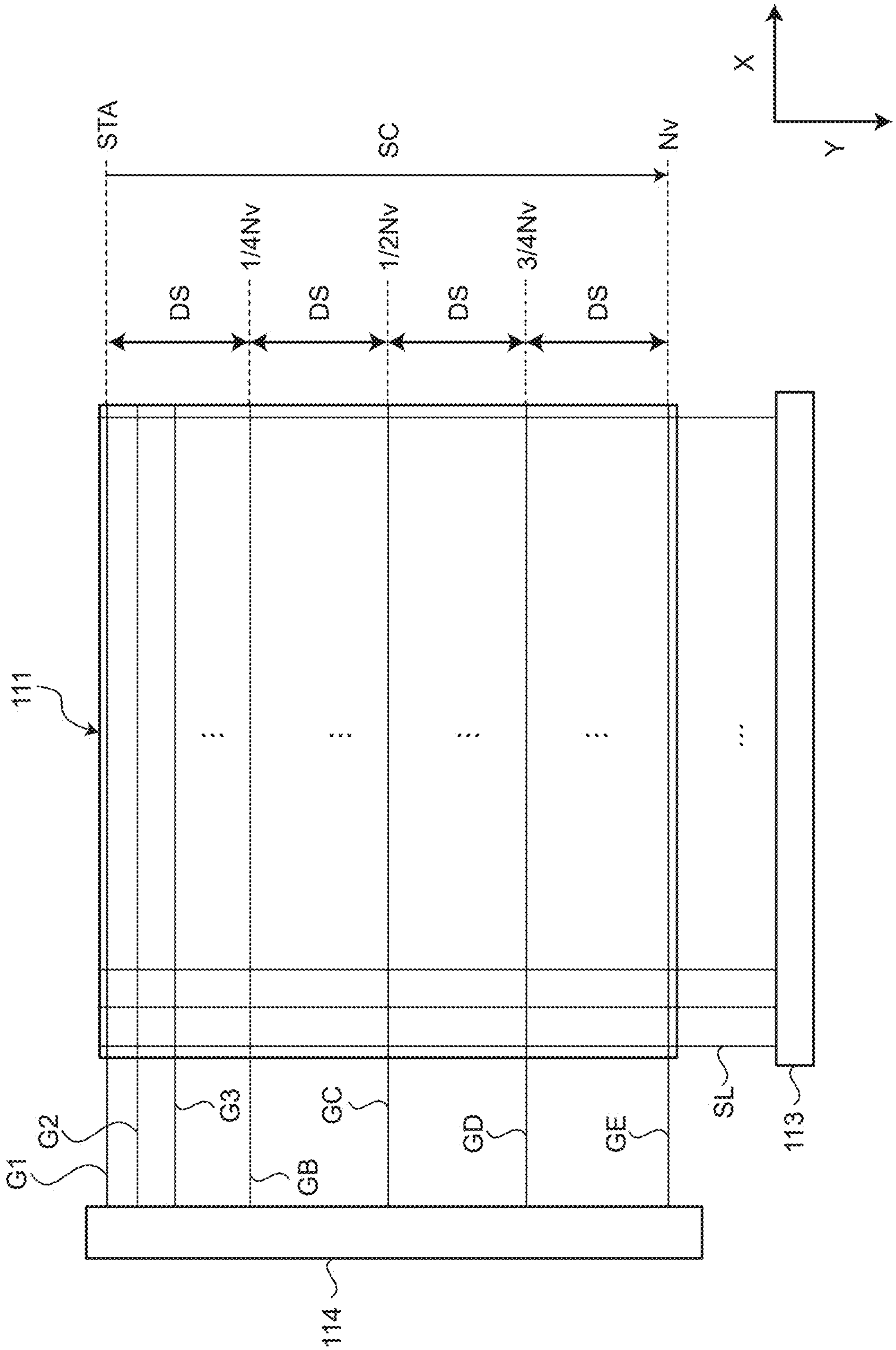
FIG. 7 is a diagram for explaining scanning performed to supply gate signals.

The following describes supplying the gate signals and the pixel signals according to the embodiment in greater detail with reference to FIG. 7.

FIG. 7 is a diagram for explaining scanning performed to supply the gate signals. In the explanation with reference to FIG. 7 and the subsequent figures, it is assumed that the scanning lines GL are arrayed from one end in the Y-direction to the other in the order of scanning lines G1, G2, G3, . . . , GB, . . . , GC, . . . . GD, . . . , and GE. The distance between the scanning line G1 and the scanning line GB, the distance between the scanning line GB and the scanning line GC, the distance between the scanning line GC and the scanning line GD, and the distance between the scanning line GD and the scanning line GE are a distance DS and can be considered to be equal. The number of scanning lines GL arrayed in each distance DS is the same.

In the following description, the term "scanning" used unless otherwise noted refers to supplying the gate signals from the scanning line drive circuit 114 to display and output one frame image. In scanning, the supply of the gate signal is performed on a scanning line GL basis. Specifically, the scanning lines GL are supplied with the gate signal at different timings. More specifically, the scanning line GL to which the gate signal is supplied is shifted sequentially from the scanning line GL on one end in the Y-direction to the other end. In other words, the timing when the gate signal is supplied to the scanning line G1, the timing when the gate signal is supplied to the scanning line G2, the timing when the gate signal is supplied to the scanning line G3, . . . , the timing when the gate signal is supplied to the scanning line GB, . . . , the timing when the gate signal is supplied to the scanning line GC, . . . , the timing when the gate signal is supplied to the scanning line GD, . . . , and the timing when the gate signal is supplied to the scanning line GE, are sequentially provided in scanning. By supplying the pixel signals from the signal line coupling circuit 113 via the signal lines SL at a timing when the gate signal is supplied to a certain scanning line GL, the pixel signals are supplied to a plurality of pixels Pix coupled to the certain scanning line GL. In other words, the signal lines SL are supplied with the pixel signals to be supplied to the pixels Pix coupled to the scanning line GL to which the gate signal is being supplied in scanning.

In the following description, a pixel row refers to a plurality of pixels Pix that share a single scanning line GL. Thus, one pixel row is composed of a plurality of pixels Pix coupled to one scanning line GL. The pixels Pix in one pixel row are arrayed in the X-direction.

Next, signal control for updating a displayed and output frame image is described with reference to FIG. 8.

Figure 8:
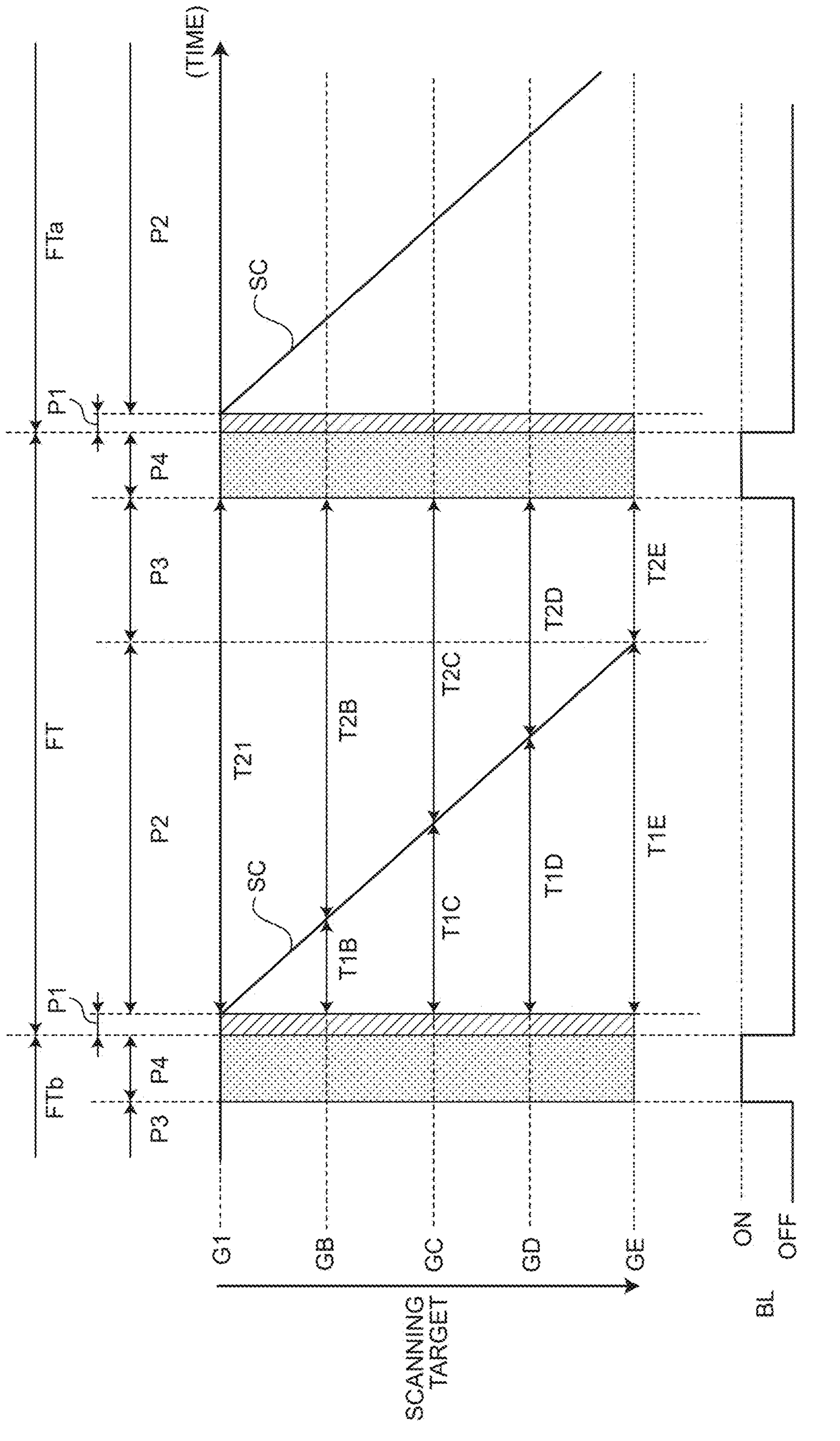
FIG. 8 is a timing chart of signal control for updating a frame image.

FIG. 8 is a timing chart of signal control for updating a frame image. In the following description, a frame period FT refers to a period for displaying and outputting one frame image. The frame period FT includes a period for updating a frame image once and a period for displaying and outputting the updated frame image. Specifically, as illustrated in FIG. 8, the frame period FT includes a first period P1, a second period P2, a third period P3, and a fourth period P4. The first period P1, the second period P2, and the third period P3 correspond to the period for updating a frame image once. The fourth period P4 corresponds to the period for displaying and outputting the updated frame image.

The first period P1 is a period for resetting all the pixels Pix. Specifically, all the scanning lines GL are supplied with the gate signal, and all the signal lines SL are supplied with a predetermined pixel signal in the first period P1. The predetermined pixel signal functions as a reset signal. The predetermined pixel signal will be described later in greater detail.

Scanning is performed in the second period P2. Therefore, in the second period P2, the scanning line GL to which the gate signal is supplied, is shifted sequentially from the scanning line GL on one end in the Y-direction to that on the other end, and the signal lines SL are supplied with the pixel signals to be supplied to the pixels Pix coupled to the scanning line GL to which the gate signal is being supplied.

The scanning line drive circuit 114 has a function to alternately perform the first process and the second process. The first process is the process of collectively supplying the gate signals to all the scanning lines GL in the first period P1, and the second process is the process of scanning in the second period P2. The scanning in the second period P2 is carried out by what is called a shift register, for example. The collectively supplying the gate signals in the first period P1 is carried out by a switch that couples a line for supplying the gate signals to all the scanning lines GL not via a shift register, for example.

The reset signal supplied from the signal line coupling circuit 113 in the first period P1 may be generated by the driver IC 115 and supplied to the signal lines SL via the signal line coupling circuit 113 or may be supplied to the signal lines SL in other ways. For example, the display panel 110 may be provided with a switch that can collectively couple or decouple a potential line supplied with a potential functioning as the reset signal to or from the signal lines SL. In this case, the potential line and the signal lines SL are coupled by turning on the switch in the first period P1 and are decoupled by turning off the switch in the periods other than the first period P1.

In FIG. 8, the objects to be supplied with the gate signal in scanning are arranged in the vertical direction as the "scanning target". In FIG. 8, the scanning line G1, the scanning line GB, the scanning line GC, the scanning line GD, and the scanning line GE are illustrated as representative scanning targets out of the scanning lines GL. In actual scanning, however, all the scanning lines GL arrayed from one end in the Y-direction to the other end are included in the scanning targets. In FIG. 8, a scanning transition line SC indicates the relation between the transition of the scanning line to be supplied with the gate signal in the scanning and time. The gate signal is supplied to the scanning target at a timing corresponding to the intersection of the scanning target and the scanning transition line SC. Therefore, the timing of supplying the gate signal to the scanning line G1 is a timing immediately after the start of the second period P2. The timing of supplying the gate signal to the scanning line GB is a timing after the elapse of a first response time T1B since the start of the second period P2. The timing of supplying the gate signal to the scanning line GC is a timing after the elapse of a first response time TIC since the start of the second period P2. The first response time TIC is longer than the first response time T1B. The timing of supplying the gate signal to the scanning line GD is a timing after the elapse of a first response time T1D since the start of the second period P2. The first response time T1D is longer than the first response time TIC. The timing of supplying the gate signal to the scanning line GE is a timing after the elapse of a first response time TIE since the start of the second period P2. The first response time T1E is longer than the first response time T1D.

In the following description, a first response time T1 collectively refers to the time from when the second period P2 starts to when the gate signal is supplied, such as the first response times T1B, TIC, T1D, and TIE. The length of the first response time T1 depends on the position of each scanning line GL as indicated by the difference between the first response time T1B, the first response time TIC, the first response time T1D, and the first response time T1E. The first response time T1 is shorter as the scanning line GL is disposed closer to one end in the Y-direction. The first response time T1 is longer as the scanning line GL is disposed closer to the other end in the Y-direction.

The third period P3 serves as an interval between the second period P2 and the fourth period P4. The third period P3 is provided in the frame period FT because the liquid crystal molecules LM in the pixels Pix take a certain amount of time to respond to the supplied pixel signals.

As described above, the timings of supplying the gate signal to the scanning lines GL are different from one another in the second period P2. Therefore, the time from when the pixel signals are supplied to the pixels Pix coupled to the scanning line GL to when the fourth period P4 starts after the third period P3 differs between the pixel rows.

In the following description, a second response time T2 collectively refers to the time from the timing of supplying the gate signal, that is, the timing of supplying the pixel signals, to the fourth period P4. In FIG. 8, second response times T21, T2B, T2C, T2D, and T2E are illustrated as examples of the second response time T2. The second response time T21 is the second response time T2 of the pixel row that shares the scanning line G1. The second response time T2B is the second response time T2 of the pixel row that shares the scanning line GB. The second response time T2B is shorter than the second response time T21. The second response time T2C is the second response time T2 of the pixel row that shares the scanning line GC. The second response time T2C is shorter than the second response time T2B. The second response time T2D is the second response time T2 of the pixel row that shares the scanning line GD. The second response time T2D is shorter than the second response time T2C. The second response time T2E is the second response time T2 of the pixel row that shares the scanning line GE. The second response time T2E is shorter than the second response time T2D.

The backlight is turned on in the fourth period P4. Specifically, the response of the liquid crystal molecules LM to the pixel signals supplied in the second period P2 is completed after the third period P3. Therefore, an image is displayed and output by individually controlling the degree of transmission of light from the backlight in each pixel Pix in the fourth period P4.

In FIG. 8, the lit state and the unlit state of the backlight are represented by a square wave indicating the switching ON/OFF in the "BL" row. As indicated by "OFF" in the square wave, the backlight is not turned on in the first period P1, the second period P2, or the third period P3. As indicated by "ON" in the square wave, the backlight is turned on in the fourth period P4.

A frame period FTb illustrated in FIG. 8 is the frame period immediately before the frame period FT illustrated in FIG. 8. A frame period FTa illustrated in FIG. 8 is the frame period immediately after the frame period FT illustrated in FIG. 8. The same signal control as in the frame period FT is performed in the frame period FTa and the frame period FTb. In the embodiment, a predetermined number of times of frame periods are provided in a predetermined time (e.g., one second) according to a predetermined refresh rate. While the predetermined number of times may be any desired number of times, it is 90 times, for example. If the predetermined number of times is another number of times, it is preferably 90 times or more as appropriate for the use of the HMD.

The following describes the technical significance of providing the first period P1 before the second period P2 in the frame period FT. As a premise for the technical significance, overdrive performed in the liquid crystal display is described with reference to FIG. 10.

Figure 10:
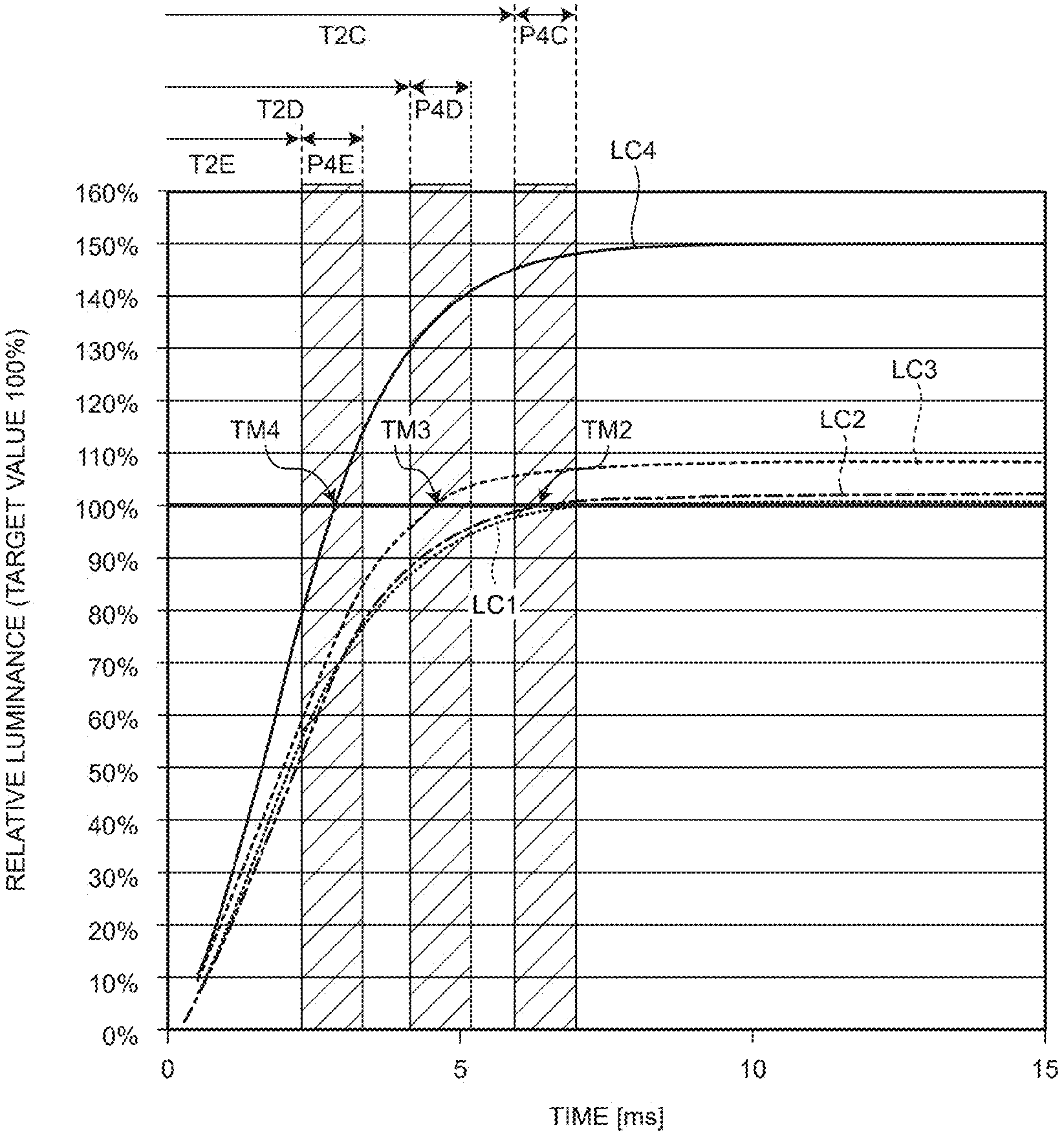
FIG. 10 is a graph for explaining the mechanism of overdrive.

FIG. 10 is a graph for explaining the mechanism of overdrive. The horizontal axis in FIG. 10 and FIGS. 11 and 12, which will be described later, indicates the elapsed time since the pixel signal is supplied to a certain pixel Pix. The vertical axis in FIG. 10 and FIGS. 11 and 12, which will be described later, relatively indicates the luminance of display output in percent, which is performed at the position of the pixel Pix in accordance with the pixel signal supplied to the pixel Pix. The graphs (e.g., a graph LC1) in FIG. 10 and FIGS. 11 and 12, which will be described later, reflect the response speed of the pixel Pix according to the difference in luminance of the pixel Pix before and after the pixel signal is supplied. For example, the graph in FIG. 10 indicates the response speed of the pixel Pix when the luminance of display output by the pixel Pix driven in accordance with the supplied pixel signal is considered to be 100% and the luminance of display output by the pixel Pix before the pixel signal is supplied is 0%.

Figure 9:
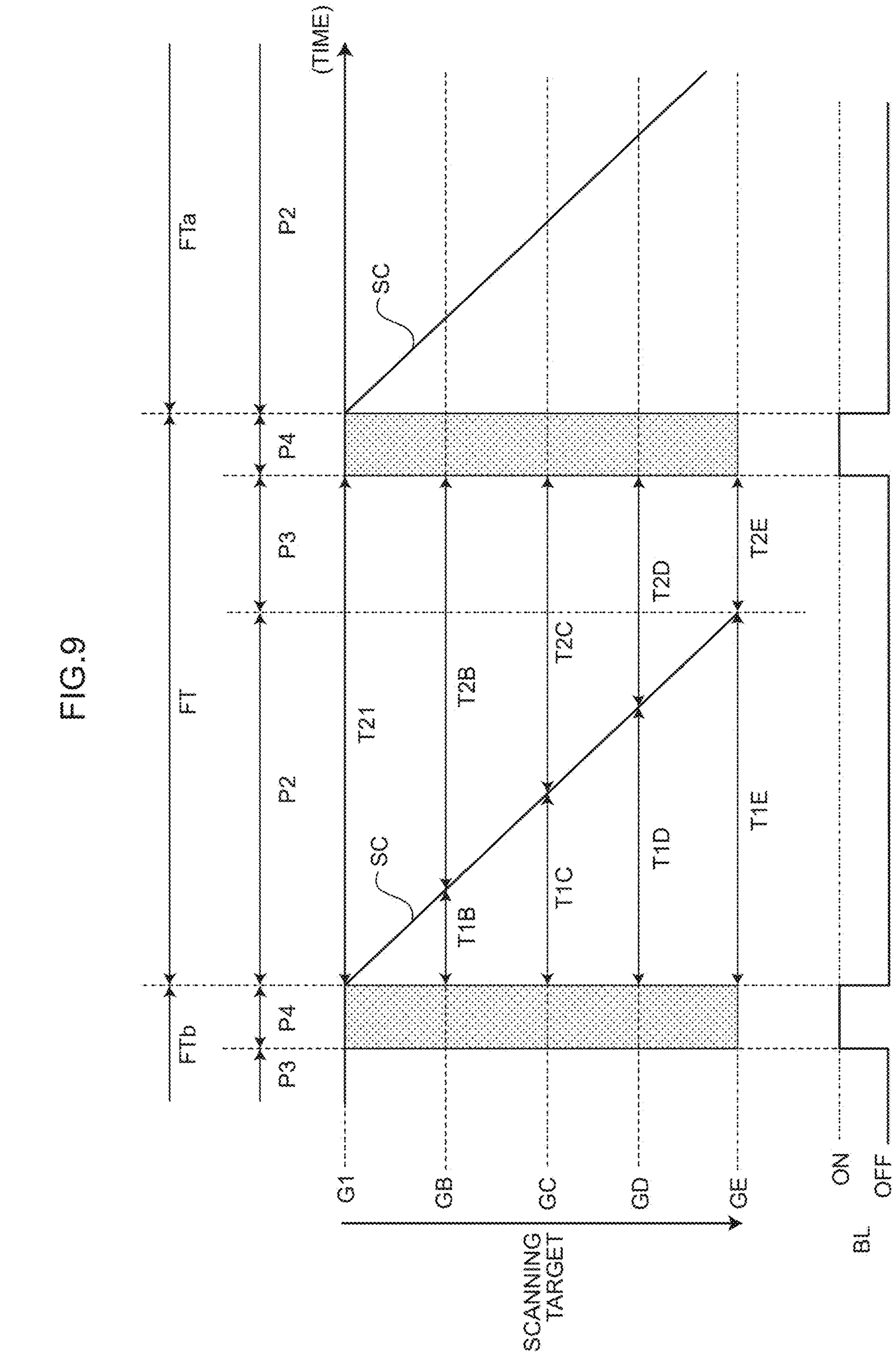
FIG. 9 is a timing chart of control signals without P1.

FIG. 9 is a timing chart of control signals without P1. FIG. 9 illustrates a case where P1 included in the frame period FT in the description with reference to FIG. 8 is not provided and the voltage of the pixel in the previous frame FTb is maintained even after the P4 period. In this case, the response in the second response time T2 of the previous frame FTb is extended, and the first response time T1 continues until just before the second response time T2 of the frame FT. Also in FIG. 9, the second response time T2 differs between the pixel rows as described with reference to FIG. 8. Therefore, the lighting period of the backlight based on the timing of supplying the pixel signal differs between the pixel rows. Specifically, the period for lighting the backlight starts earlier with respect to the timing of supplying the pixel signal as the pixel row has a shorter second response time T2. FIG. 10 illustrates fourth periods P4E, P4D, and P4C as such a "deemed backlight lighting period".

The fourth period P4E is the "deemed backlight lighting period" for the pixel row that shares the scanning line GE. Therefore, the fourth period P4E starts after the elapse of the second response time T2E (refer to FIG. 8) since the timing of supplying the pixel signal. The fourth period PAD is the "deemed backlight lighting period" for the pixel row that shares the scanning line GD. Therefore, the fourth period PAD starts after the elapse of the second response time T2D (refer to FIG. 8) since the timing of supplying the pixel signal. The fourth period P4C is the "deemed backlight lighting period" for the pixel row that shares the scanning line GC. Therefore, the fourth period P4C starts after the elapse of the second response time T2C (refer to FIG. 8) since the timing of supplying the pixel signal. The fourth period P4E, the fourth period P4D, and the fourth period P4C are actually the same fourth period P4.

Assume a case where the pixel signal for updating the luminance of a certain pixel Pix from 0% to 100% is supplied in accordance with the update of the frame image.

In this case, the simplest signal processing is to supply the pixel signal indicating a luminance of 100% to the pixel Pix. Assume that the response of the pixel Pix by the simplest signal processing can be represented by a graph LC1 illustrated in FIG. 10. In the graph LC1, the timing of reaching a luminance of 100% comes later than the fourth period P4C and is not in time for the fourth period P4E, the fourth period P4D, or the fourth period P4C. Therefore, in the simplest signal processing, the response of the pixel Pix fails to be in time for the end of the fourth period P4, and the pixel Pix fails to produce a luminance of 100% expected from the pixel signal. In other words, the luminance is insufficiently reproduced in the display output.

To address this, overdrive is performed in the liquid crystal display. Overdrive herein refers to supplying the pixel Pix with the pixel signal corresponding to a relative luminance difference larger than the relative luminance difference in the pixel Pix before and after the update. The degree of the "relative luminance difference larger than the relative luminance difference in the pixel Pix before and after the update" employed in overdrive is typically larger as the pixel Pix has a shorter second response time T2.

For example, a relative luminance difference of slightly larger than 100% is employed by overdrive for the pixels Pix in the pixel row that share the scanning line GC (refer to FIGS. 7 and 8). By employing the degree of relative luminance difference, the response of the pixel Pix is represented by a graph LC2 illustrated in FIG. 10. In the graph LC2, the timing of reaching a luminance of 100% corresponds to a timing TM2 in the fourth period P4C and is in time for the fourth period P4C. Furthermore, the timing TM2 substantially coincides with the midpoint between the start point and the end point of the fourth period P4C. As a result, the average luminance of the pixel Pix produced in the fourth period P4C is substantially 100%, whereby the luminance can be controlled with higher accuracy.

A relative luminance difference close to 110% is employed by overdrive for the pixels Pix in the pixel row that share the scanning line GD (refer to FIGS. 7 and 8). By employing the degree of relative luminance difference, the response of the pixel Pix is represented by a graph LC3 illustrated in FIG. 10. In the graph LC3, the timing of reaching a luminance of 100% corresponds to a timing TM3 in the fourth period P4D and is in time for the fourth period P4D. Furthermore, the timing TM3 substantially coincides with the midpoint between the start point and the end point of the fourth period P4D. As a result, the average luminance of the pixel Pix produced in the fourth period PAD is substantially 100%, whereby the luminance can be controlled with higher accuracy.

A relative luminance difference of approximately 150% is employed by overdrive for the pixels Pix in the pixel row that share the scanning line GE (refer to FIGS. 7 and 8). By employing the degree of relative luminance difference, the response of the pixel Pix is represented by a graph LC4 illustrated in FIG. 10. In the graph LC4, the timing of reaching a luminance of 100% corresponds to a timing TM4 in the fourth period P4E and is in time for the fourth period P4E. Furthermore, the timing TM4 substantially coincides with the midpoint between the start point and the end point of the fourth period P4E. As a result, the average luminance of the pixel Pix produced in the fourth period P4E is substantially 100%, whereby the luminance can be controlled with higher accuracy.

Thus, the luminance can be reproduced with higher accuracy by performing overdrive. The basic concept of overdrive has been described above with reference to FIG. 10. To actually perform overdrive, however, it is necessary to consider more complex factors, such as the difference in relative luminance before and after the update. The following describes the relation between overdrive and the difference in relative luminance before and after the update with reference to FIG. 11.

Figure 11:
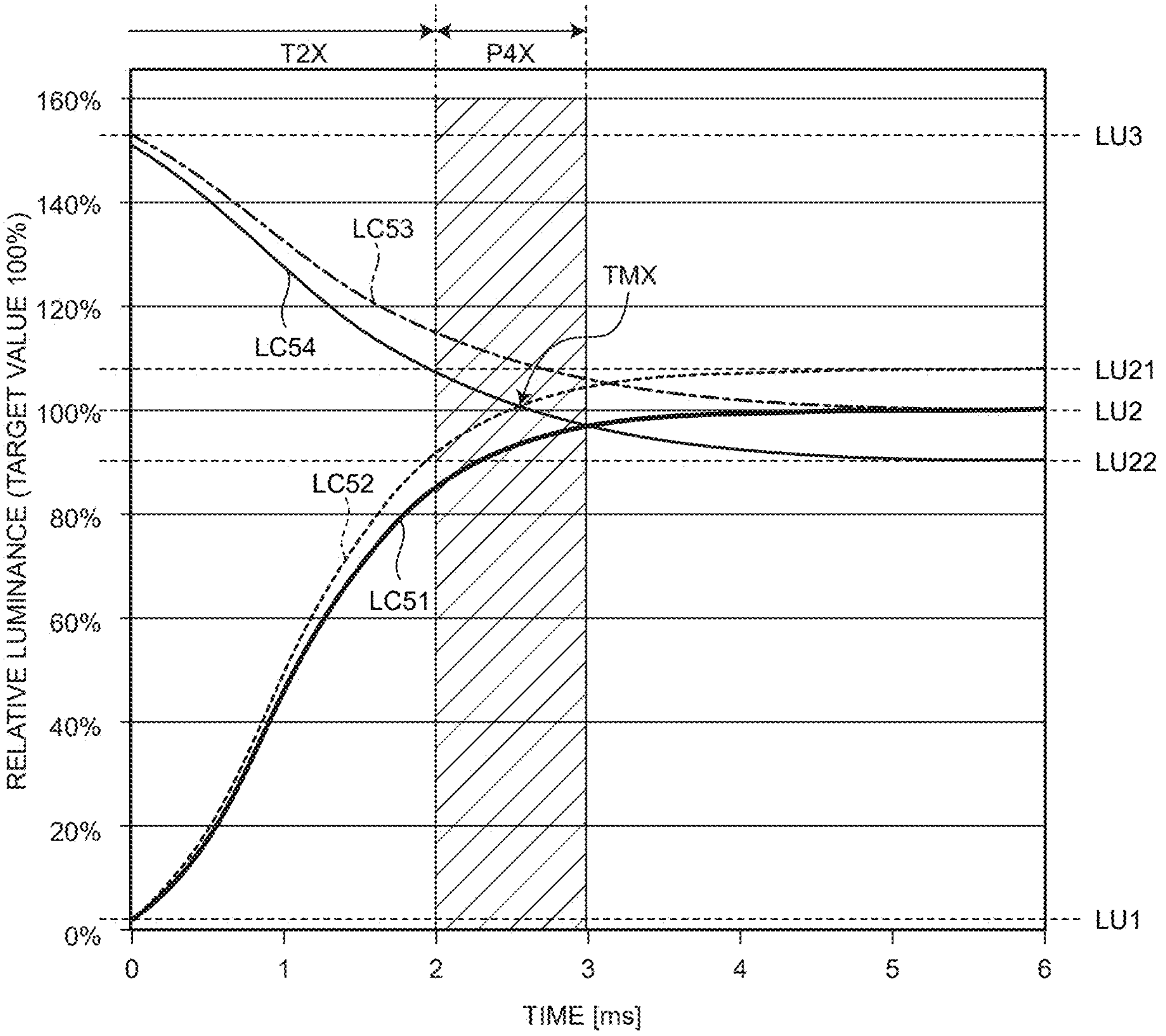
FIG. 11 is a graph for explaining the relation between overdrive and the difference in relative luminance before and after the update.

FIG. 11 is a graph for explaining the relation between overdrive and the difference in relative luminance before and after the update. In the explanation with reference to FIG. 11 and FIG. 12, which will be described later, it is assumed that a luminance of 100%, that is, luminance LU2, is produced in the pixel Pix in a fourth period P4X after the pixel signal is updated. The fourth period P4X is the "deemed backlight lighting period" for the pixel row that shares a certain scanning line GL. The fourth period P4X starts after the elapse of a second response time T2X since the timing of supplying the pixel signal. The second response time T2X is the second response time T2 of the pixel row.

In the explanation with reference to FIG. 11 and FIG. 12, which will be described later, luminance LU1 is a luminance of 0% in the vertical axis (relative luminance). Luminance LU3 is an example of high luminance significantly higher than 100%. The luminance LU3 is higher than 150% and lower than 160%. Luminance LU21 is an example of luminance higher than the luminance LU2 and significantly lower than the luminance LU3. Luminance LU22 is an example of luminance lower than the luminance LU2 and significantly higher than the luminance LU1.

For example, assume that the response of the pixel Pix can be represented by a graph LC51 illustrated in FIG. 11 if the simplest signal processing without overdrive is performed when the luminance of the pixel Pix before the update of the pixel signal is the luminance LU1. In the graph LC51, the timing of reaching a luminance of 100% comes later than the fourth period P4X and is not in time for the fourth period P4X. Therefore, in this case, by performing overdrive and supplying the pixel signal corresponding to the luminance LU21 to the pixel Pix, the response of the pixel Pix is represented by a graph LC52. In the graph LC52, the timing of reaching a luminance of 100% corresponds to a timing TMX in the fourth period P4X and is in time for the fourth period P4X.

Assume that the response of the pixel Pix can be represented by a graph LC53 illustrated in FIG. 11 if the simplest signal processing without overdrive is performed when the luminance of the pixel Pix before the update of the pixel signal is the luminance LU3. In the graph LC53, the timing of reaching a luminance of 100% comes later than the fourth period P4X and is not in time for the fourth period P4X. Therefore, in this case, by performing overdrive and supplying the pixel signal corresponding to the luminance LU22 to the pixel Pix, the response of the pixel Pix is represented by a graph LC54. In the graph LC54, the timing of reaching a luminance of 100% corresponds to a timing TMX in the fourth period P4X and is in time for the fourth period P4X.

Thus, if the first period P1 is not provided as in the example illustrated in FIG. 9, it is necessary to supply the pixel signal corresponding to the luminance LU22 or the luminance LU21 instead of the luminance LU2 to the pixel Pix so as to reach a luminance of 1008. Whether the target luminance is the luminance LU22, the luminance LU21, or the luminance corresponding to any other gradation, needs to be determined based on the luminance difference before and after the update (image data in TFb and TF) and the response speed of the pixel, and it is necessary to provide a means for the determination. As described with reference to FIG. 11, when the luminance of the pixel Pix before the update of the pixel signal is the luminance LU1 lower than the luminance LU2, the luminance LU21 higher than the luminance LU2 is supplied as the pixel signal for the update. When the luminance of the pixel Pix before the update of the pixel signal is the luminance LU3 higher than the luminance LU2, the luminance LU22 lower than the luminance LU2 is supplied as the pixel signal for the update. As described above, to perform overdrive, it is necessary to vary the pixel signal supplied for the update depending on whether the luminance of the pixel Pix before the update of the pixel signal is relatively higher or lower than the luminance LU2, although the purpose is the same in that the luminance LU2 is produced in the pixel Pix in the fourth period P4X after the update of the pixel signal.

Furthermore, the response of the pixel Pix to the pixel signal after the update is also affected by factors other than the relative luminance before and after the update, such as the temperature of the liquid crystal.

Figure 12:
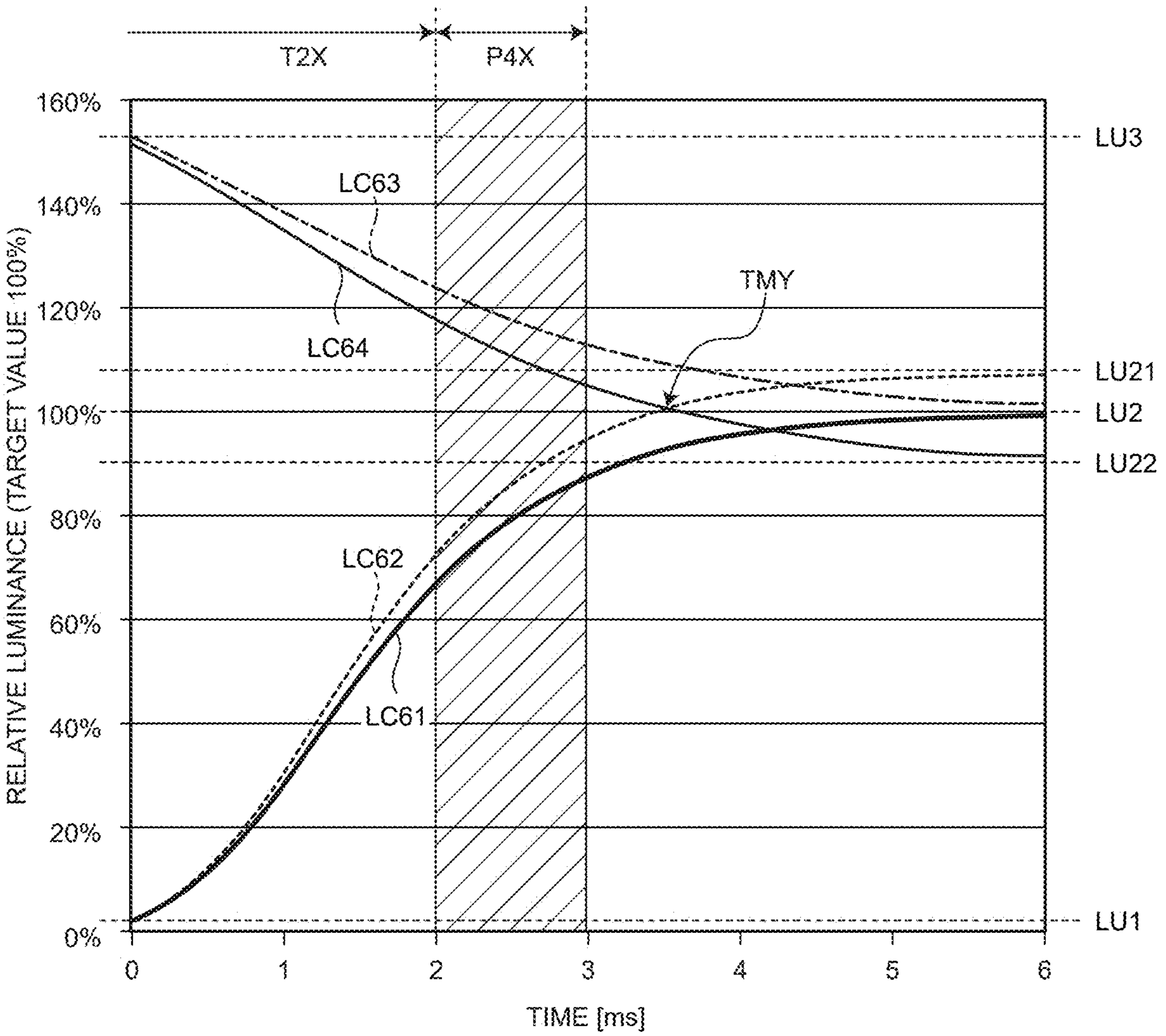
FIG. 12 is a graph of an example of the response of a pixel Pix when the temperature of liquid crystal molecules LM is lower than that of the liquid crystal molecules LM assumed in the explanation with reference to FIG. 11.

FIG. 12 is a graph of an example of the response of the pixel Pix when the temperature of the liquid crystal molecules LM is lower than that of the liquid crystal molecules LM assumed in the explanation with reference to FIG. 11. When the temperature of the liquid crystal molecules LM is lower, the response of the liquid crystal molecules LM is typically slower. In other words, when the temperature of the liquid crystal molecules LM is lower, the response of the pixel Pix is slower.

FIG. 12 illustrates that a decrease in temperature of the liquid crystal molecules LM causes the response of the pixel Pix to be represented by a graph LC61 when the same control as in the graph LC51 illustrated in FIG. 11 is performed. Similarly, a decrease in temperature of the liquid crystal molecules LM causes the response of the pixel Pix to be represented by a graph LC62 when the same control as in the graph LC52 illustrated in FIG. 11 is performed. A decrease in temperature of the liquid crystal molecules LM causes the response of the pixel Pix to be represented by a graph LC63 when the same control as in the graph LC53 illustrated in FIG. 11 is performed. A decrease in temperature of the liquid crystal molecules LM causes the response of the pixel Pix to be represented by a graph LC64 when the same control as in the graph LC54 illustrated in FIG. 11 is performed.

In the graphs LC62 and LC64, the timing of reaching a luminance of 100% corresponds to a timing TMY later than the fourth period P4X and is not in time for the fourth period P4X although overdrive is performed. Thus, if a decrease in temperature of the liquid crystal molecules LM fails to be correctly reflected on the conditions for performing overdrive, the response of the pixel Pix may fail to be in time even when overdrive is performed.

Furthermore, the effect on the luminance when the response of the pixel Pix is not in time even when overdrive is performed, depends on the luminance of the pixel Pix before the update. Specifically, when the luminance of the pixel Pix before the update of the pixel signal is lower than the luminance LU2, like the luminance LU1, for example, the luminance of the pixel Pix produced in the fourth period P4X is lower than the originally assumed luminance of the pixel Pix. In contrast to this, when the luminance of the pixel Pix before the update of the pixel signal is higher than the luminance LU2, like the luminance LU3, for example, the luminance of the pixel Pix produced in the fourth period P4X is higher than the originally assumed luminance of the pixel Pix. This variations in luminance reproduction depending on the relative high-low relation of the luminance of the pixel Pix before and after the update cause variations in luminance distribution such that the luminance is lower than the assumed luminance in one part of the displayed image and higher than the assumed luminance in another part. If overdrive is not performed, the variations in luminance distribution become more significant.

Thus, reproducing ideal luminance is not easy even when overdrive is performed, considering the change in the response of the pixel Pix due to external factors, such as the temperature of the liquid crystal molecules LM.

In addition, the overdrive in FIG. 10 is performed based on the difference in relative luminance of the image before and after the update. Therefore, an extra component is required to retain information indicating the luminance of the pixel Pix before the update of the pixel signal.

Figure 13:
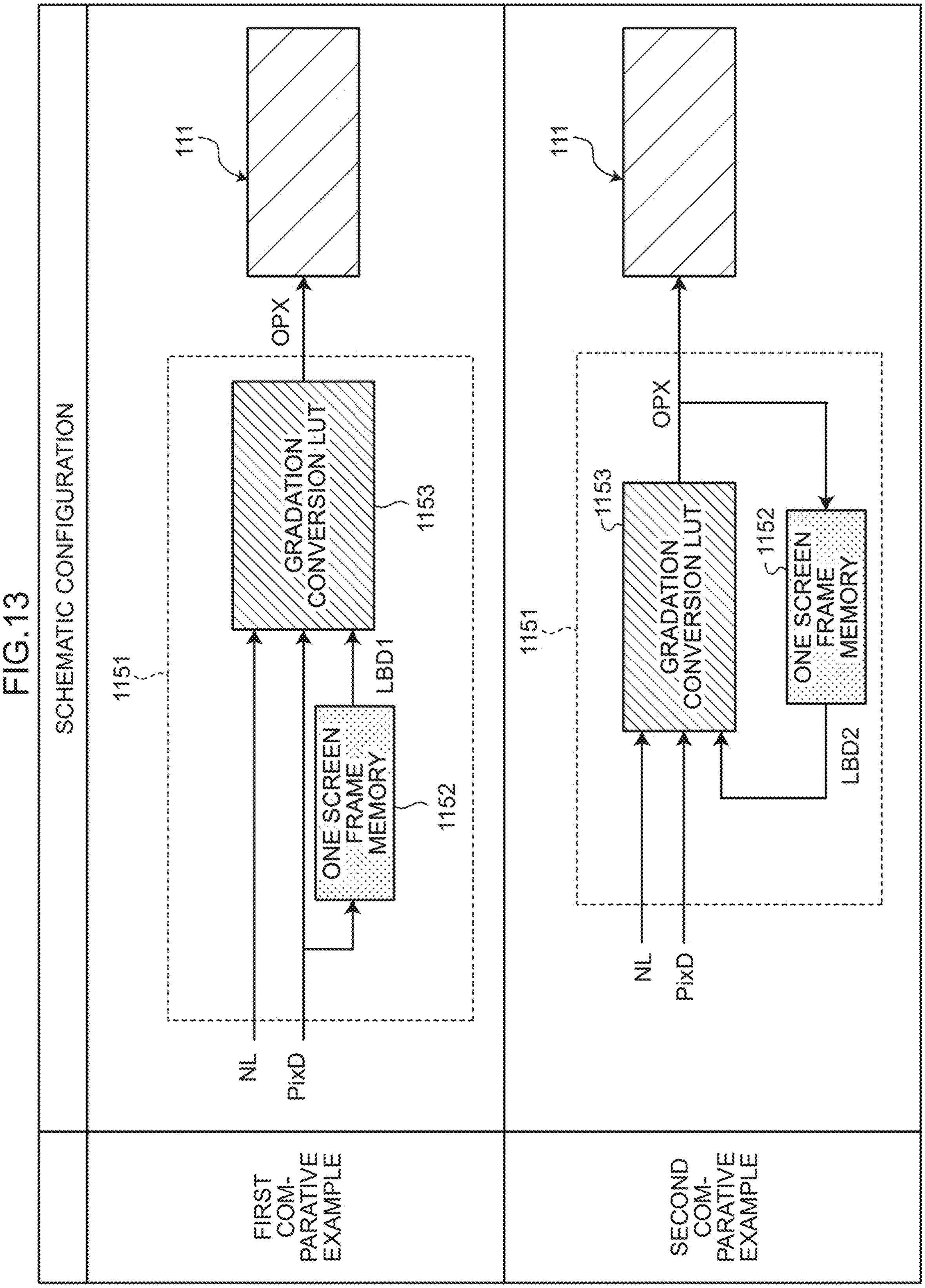
FIG. 13 is a block diagram of schematic configurations employed in comparative examples that perform overdrive based on the difference in relative luminance of the image before and after the update.

FIG. 13 is a block diagram of schematic configurations employed in comparative examples that perform overdrive based on the difference in relative luminance of the image before and after the update. As described with reference to FIGS. 11 and 12, information indicating the luminance of the pixel Pix before the update of the pixel signal is required to perform overdrive based on the difference in relative luminance before and after the update. The information indicating the luminance of the pixel Pix before the update of the pixel signal is image data corresponding to the image displayed in the frame period (frame period FTb in FIG. 9) immediately before the frame period FT in which the pixel signal is updated. Therefore, a one screen frame memory 1152 is provided in a driver IC 1151 as illustrated in a "first comparative example" and a "second comparative example" in FIG. 13. When the configurations as in the "first comparative example" and the "second comparative example" illustrated in FIG. 13 are employed, the driver IC 1151 is provided instead of the driver IC 115 of the display panel 110.

Both in the "first comparative example" and the "second comparative example", a lookup table for performing overdrive is stored in a gradation conversion LUT 1153, and a pixel signal OPX after the execution of overdrive is output by the gradation conversion LUT 1153. The gradation conversion LUT 1153 outputs the pixel signal OPX according to input pixel data PixD and the lookup table stored therein. A row number NL is information indicating the pixel row including the pixel Pix corresponding to the input pixel data PixD.

In the "first comparative example", the input path for the pixel data PixD is branched, and the pixel data PixD is stored in the one screen frame memory 1152. In the frame period FT subsequent to the frame period (frame period FTb) in which the pixel data PixD is stored, the one screen frame memory 1152 outputs past pixel data LBD1 indicating the pixel signal at the time of the frame period FTb to the gradation conversion LUT 1153. The gradation conversion LUT 1153 determines the relative high-low relation of the luminance of the pixel Pix before and after the update by referring to the past pixel data LBD1 and the latest pixel data PixD. Therefore, the past pixel data LBD1 in the "first comparative example" is a signal containing the information indicating the luminance of the pixel Pix before the update of the pixel signal. Specifically, the past pixel data LBD1 is a signal of the image data corresponding to the image displayed in the frame period (frame period FTb in FIG. 8) immediately before the frame period FT in which the pixel signal OPX is supplied to the pixel Pix.

In the second comparative example, the output path for the pixel signal OPX is branched, and the pixel signal OPX is stored in the one screen frame memory 1152. In the frame period FT subsequent to the frame period (frame period FTb) in which the pixel signal OPX is output, the one screen frame memory 1152 outputs a past pixel signal LBD2 indicating the pixel signal at the time of the frame period FTb to the gradation conversion LUT 1153. The gradation conversion LUT 1153 determines the relative high-low relation of the luminance of the pixel Pix before and after the update by referring to the past pixel signal LBD2 and the latest pixel data PixD. Therefore, the past pixel signal LBD2 in the "second comparative example" is a signal containing the information indicating the luminance of the pixel Pix before the update of the pixel signal. Specifically, the past pixel signal LBD2 is a signal of the image data corresponding to the image displayed in the frame period (frame period FTb in FIG. 8) immediately before the frame period FT in which the pixel signal OPX is supplied to the pixel Pix.

If either of the configurations according to the "first comparative example" and the "second comparative example" described above is employed, the one screen frame memory 1152 needs to have a storage capacity corresponding to the data capacity of one image data displayed in one frame period.

In contrast to this, the configuration according to the embodiment does not require the one screen frame memory 1152 described with reference to FIG. 13 because the first period P1 is included in the frame period FT as illustrated in FIG. 8. This is because all the pixels Pix are reset by the predetermined pixel signal in the first period P1. This means that the pixel signals before the update required to determine the pixel signals after the update supplied to the pixels Pix in the second period P2 after the first period P1 are set as the predetermined pixel signal. The predetermined pixel signal is independent of the image displayed in the frame period (frame period FTb in FIG. 8) immediately before the frame period FT in which the pixel signal after the update is supplied to the pixel Pix. Therefore, the configuration according to the present embodiment does not require the one screen frame memory 1152.

The following describes an example of the predetermined pixel signal supplied to all the pixels Pix in the first period P1 according to the embodiment with reference to FIG. 14.

FIG. 14 is a table illustrating the response time of the pixel Pix determined by the relation between the gradation value indicated by the pixel signal before the update and the gradation value indicated by the pixel signal after the update. The "start gradation" in FIG. 14 indicates the gradation value indicated by the pixel signal before the update. The "attained gradation" indicates the gradation value indicated by the pixel signal after the update. The high-low level of the luminance of the pixel Pix corresponds to the high-low level of the gradation value indicated by the pixel signal. Therefore, the high-low relation between the "start gradation" and the "attained gradation" corresponds to the high-low relation of the luminance of the pixel Pix before and after the update described above. In the explanation with reference to FIGS. 14 to 21, it is assumed that the pixel signal is an 8-bit signal and the gradation value is any one of the values in the range from 0 to 255. This is given by way of example only and is not intended to limit the number of bits of the pixel signal according to the embodiment.

In the table illustrated in FIG. 14, the value at the intersection of the "start gradation" and the "attained gradation" indicates the response time of the pixel Pix determined by the relation between the gradation value indicated by the pixel signal before the update and the gradation value indicated by the pixel signal after the update. For example, when the "start gradation" is "0" and the "attained gradation" is "255", the value at the intersection of the "start gradation" and the "attained gradation" is 3.2. This indicates that the response time of the pixel Pix is 3.2 milliseconds (ms) when the gradation value indicated by the pixel signal before the update is "0" and the gradation value indicated by the pixel signal after the update is "255". The same applies to the other values at the intersections of the "start gradation" and the "attained gradation".

The predetermined pixel signal supplied to all the pixels Pix in the first period P1 according to the embodiment is a pixel signal indicating a gradation value of "255", for example. Therefore, the pixel signal indicating a gradation value of "255" has already been supplied to all the pixels Pix at the time of the second period P2. As a result, the pixel signal before the update corresponding to the pixel signal after the update supplied in the second period P2 is the pixel signal indicating a gradation value of "255". Therefore, in this example, it is sufficient to consider the response time of the pixel Pix indicated in an area of interest TAR where the "start gradation" is "255" in FIG. 14. A gradation value of 255 in an 8-bit pixel signal means the same as that the pixel Pix supplied with the pixel signal is driven at the highest luminance. Therefore, employing the pixel signal indicating a gradation value of "255" as the predetermined pixel signal means the same as that the pixel Pix is driven at the highest luminance before the update of the pixel signal.

Figure 15:
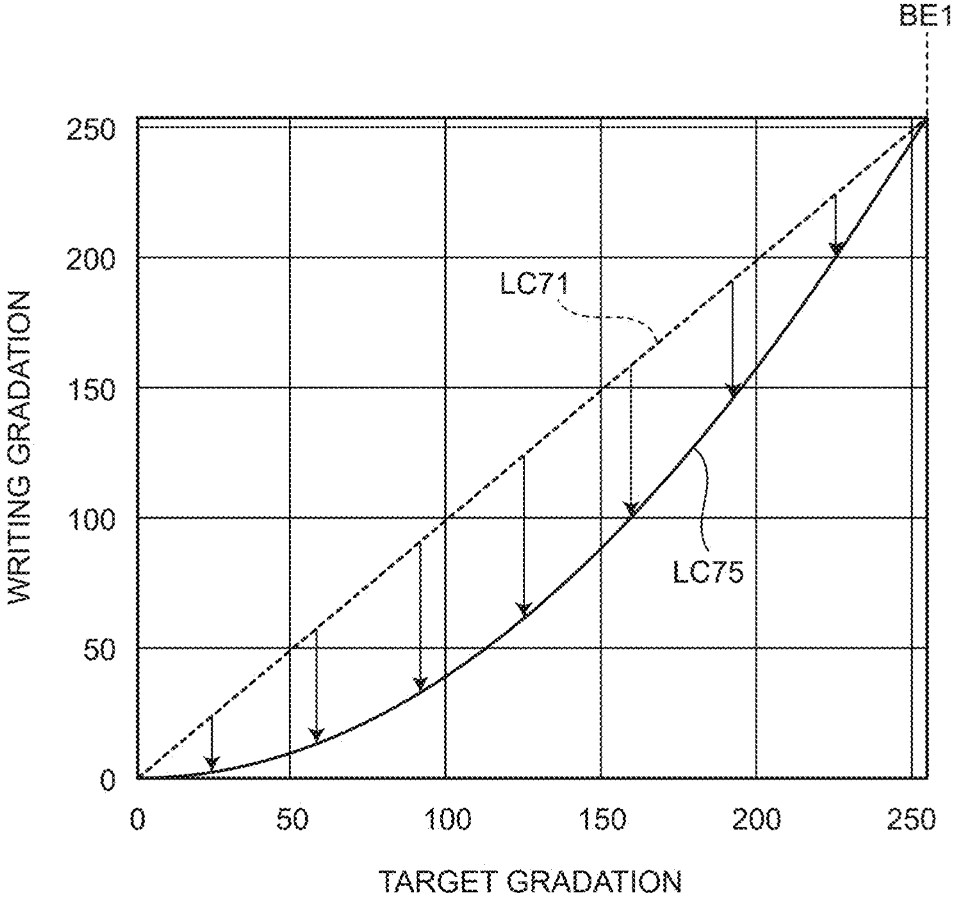
FIG. 15 is a graph of an example of the gradation value indicated by the pixel signal after the update, when overdrive is performed in a case where the pixel Pix is driven at the highest luminance before the update of the pixel signal.

FIG. 15 is a graph of an example of the gradation value indicated by the pixel signal after the update, when overdrive is performed in a case where the pixel Pix is driven at the highest luminance before the update of the pixel signal. The "target gradation" in FIG. 15 and FIGS. 16, 20, 21, 23, and 26, which will be described later, indicate the gradation value that should be reflected on the pixel Pix in the fourth period P4. In other words, the "target gradation" corresponds to "100%" of the "relative luminance" in FIGS. 10 to 12. The luminance LU2 in FIGS. 11 and 12 corresponds to the "target gradation". The "writing gradation" indicates the gradation value indicated by the pixel signal actually supplied to the pixel Pix in overdrive to cause the pixel Pix to produce the "target gradation" in the fourth period P4. The luminance LU21 and the luminance LU22 in FIGS. 11 and 12 correspond to the "writing gradation".

As described in the example with reference to FIG. 14, the predetermined pixel signal according to the embodiment is a pixel signal indicating a gradation value of "255", for example. A predetermined gradation value BE1 in FIGS. 15 and 16 indicates a gradation value of "255" as the predetermined pixel signal.

If the response of the pixel Pix is surely in time without performing overdrive, the "target gradation" and the "writing gradation" may be identical. Therefore, the relation between the "target gradation" and the "writing gradation" in this case is represented by a graph LC71 in FIG. 15.

In the overdrive when the pixel signal indicating a gradation value of "255" is employed as the predetermined pixel signal, the pixel Pix is driven to produce the highest luminance in the first period P1. As a result, the pixel signal supplied in the second period P2 is a pixel signal that drives the pixel Pix to produce the luminance equal to or lower than that before the update. Therefore, the overdrive in this case is performed such that the "writing gradation" is equal to or lower than the "target gradation" as in the relation between the luminance LU2 and the luminance LU22 in FIG. 11. Specifically, the pixel signal after the update is determined such that the "writing gradation" is below the "target gradation" except for gradation values of "0" and "255" as indicated by a graph LC75 in FIG. 15, for example.

As described with reference to FIG. 8, the timing at which the pixel signal is supplied to the pixel Pix and the second response time T2 differ between the pixel rows in the scanning. Therefore, by performing overdrive according to the second response time T2 of each pixel row, the luminance of the pixel Pix can be controlled with higher accuracy than when the same overdrive is performed on all the pixel rows. For this reason, the configuration according to the embodiment is provided with a mechanism to set the relation between the "target gradation" and the "writing gradation" for each pixel row. The mechanism is described with reference to FIGS. 16 to 19.

Figure 16:
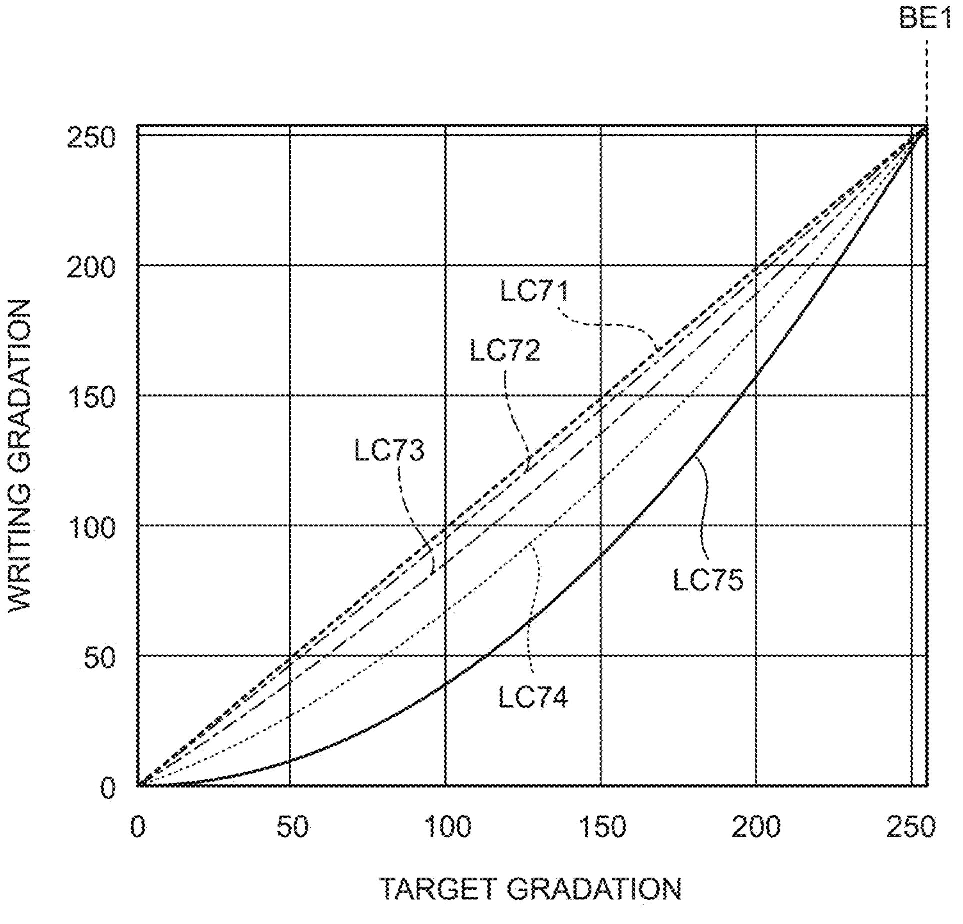
FIG. 16 is a graph indicating five lookup tables employed as criteria for performing overdrive with the relation between "target gradation" and "writing gradation"

FIG. 16 is a graph indicating five lookup tables employed as criteria for performing overdrive with the relation between the "target gradation" and the "writing gradation". In the following description, a "LUT for the pixel signal supplied to the pixel Pix" denotes a LUT referred to for deriving the "writing gradation" from the "target gradation" when performing overdrive on the pixel signal supplied to the pixel Pix in the second period P2.

FIG. 16 illustrates a graph LC71, a graph LC72, a graph LC73, a graph LC74, and a graph LC75. The graph LC71 indicates the relation between the "target gradation" and the "writing gradation" associated with the LUT for the pixel signals supplied to the pixels Pix in the pixel row that share the scanning line G1. The graph LC72 indicates the relation between the "target gradation" and the "writing gradation" associated with the LUT for the pixel signals supplied to the pixels Pix in the pixel row that share the scanning line GB. The graph LC73 indicates the relation between the "target gradation" and the "writing gradation" associated with the LUT for the pixel signals supplied to the pixels Pix in the pixel row that share the scanning line GC. The graph LC74 indicates the relation between the "target gradation" and the "writing gradation" associated with the LUT for the pixel signals supplied to the pixels Pix in the pixel row that share the scanning line GD. The graph LC75 indicates the relation between the "target gradation" and the "writing gradation" associated with the LUT for the pixel signals supplied to the pixels Pix in the pixel row that share the scanning line GE.

Thus, the embodiment performs overdrive such that the "writing gradation" is below the "target gradation" to a greater degree as the pixel row has a shorter second response time T2 described with reference to FIG. 8. In the example illustrated in FIG. 16, the "writing gradation" can be derived based on the "target gradation" for the five scanning lines GL, that is, the scanning lines G1, GB, GC, GD, and GE, by referring to the LUT directly corresponding thereto.

The difference between the gradation value of the "target gradation" and "255" as the gradation value of the predetermined pixel signal is referred to as a first difference. The difference between the gradation value of the "writing gradation" and "255" as the gradation value of the predetermined pixel signal is referred to as a second difference. Based on this, focus on the relation between the first difference and the second difference in each of the graphs LC71, LU72, LU73, LU74, and LU75. However, the part where the "target gradation" is "0" or "255" is excluded.

In the graph LC71 where overdrive is not virtually performed, the first difference is equal to the second difference. In contrast to this, in the graphs LC72, LU73, LU74, and LU75 where overdrive is performed, the second difference is larger than the first difference. The gradation value of the "target gradation" is the gradation value of pixel data included in image data, such as the pixel data PixD (refer to FIGS. 18 and 19). Therefore, overdrive can be considered to be the processing in which: the "difference between the gradation value indicated by the pixel data included in the image data and the predetermined gradation value corresponding to the reset signal", such as the first difference, is used as a reference value; the gradation value the difference of which from the predetermined gradation value is larger than the reference value is regarded as the "writing gradation"; and the pixel signal corresponding to the "writing gradation" is generated.

In the graph LC75, the magnitude of the second difference with respect to the first difference is larger than in the graphs LC72, LU73, and LU74. In the graph LC74, the magnitude of the second difference with respect to the first difference is larger than in the graphs LC72 and LU73. In the graph LC73, the magnitude of the second difference with respect to the first difference is larger than in the graph LC72. The relative relation of the magnitude of the second difference corresponds to the delay in the timing of supplying the gate signal in the second period P2 to the scanning lines GL corresponding to the respective graphs LC72, LU73, LU74, and LU75. The scanning line GL to which the graph LC75 corresponds is the scanning line GE. The scanning line GL to which the graph LC74 corresponds is the scanning line GD. The scanning line GL to which the graph LC73 corresponds is the scanning line GC. The scanning line GL to which the graph LC72 corresponds is the scanning line GB. The scanning line GL to which the graph LC71 corresponds is the scanning line G1. The scanning line GE is supplied with the gate signal at a later timing in the second period P2 than the scanning lines GD, GC, GB, and G1. The scanning line GD is supplied with the gate signal at a later timing in the second period P2 than the scanning lines GC, GB, and G1. The scanning line GC is supplied with the gate signal at a later timing in the second period P2 than the scanning lines GB and G1. The scanning line GB is supplied with the gate signal at a later timing in the second period P2 than G1. Thus, the "magnitude of the difference between the gradation value of the pixel signal generated by overdrive and the predetermined gradation value corresponding to the reset signal", such as the second difference, is larger as the pixel signal is supplied to the pixel Pix coupled to the scanning line GL supplied with the gate signal at a later timing in the scanning.

The graphs LC72, LU73, LU74, and LU75 indicate the relation between the gradation value (target gradation) indicated by the pixel data and the gradation value (writing gradation) of the pixel signal when overdrive is performed.

The pixel signals supplied to the pixels Pix in the pixel row that share the scanning line GL for which no directly corresponding LUT is provided, are derived by interpolation. The interpolation refers to the processing of: deriving the "writing gradation" from the "target gradation" by referring to the LUTs directly corresponding to two scanning lines GL arranged closer to the scanning line GL for which no directly corresponding LUT is provided out of the scanning lines GL for which the directly corresponding LUT is provided; and generating the pixel signal.

Figure 17:
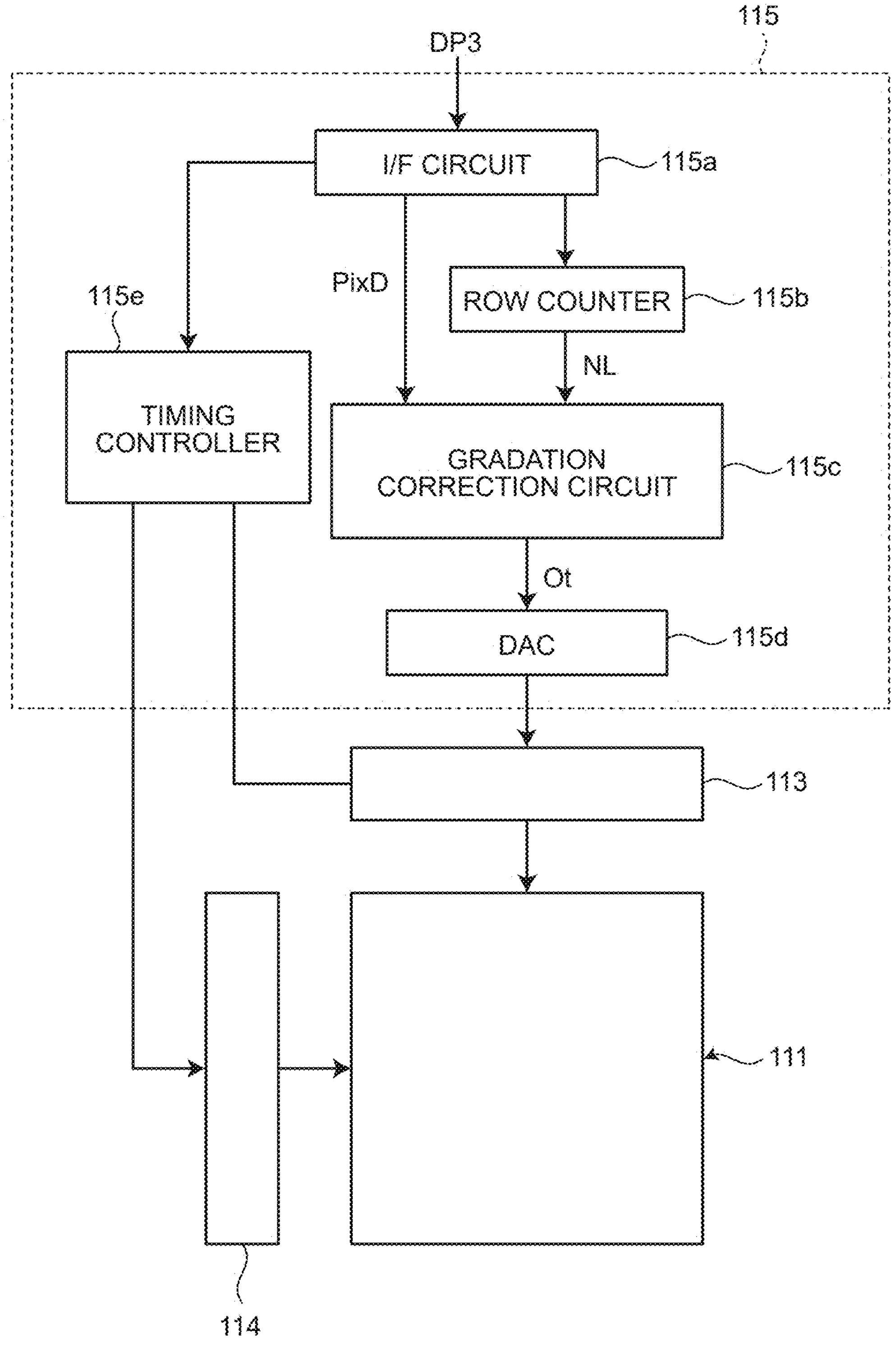
FIG. 17 is a block diagram of input/output in a driver IC 115 and the main functional configuration included in the driver IC 115.
Figure 18:
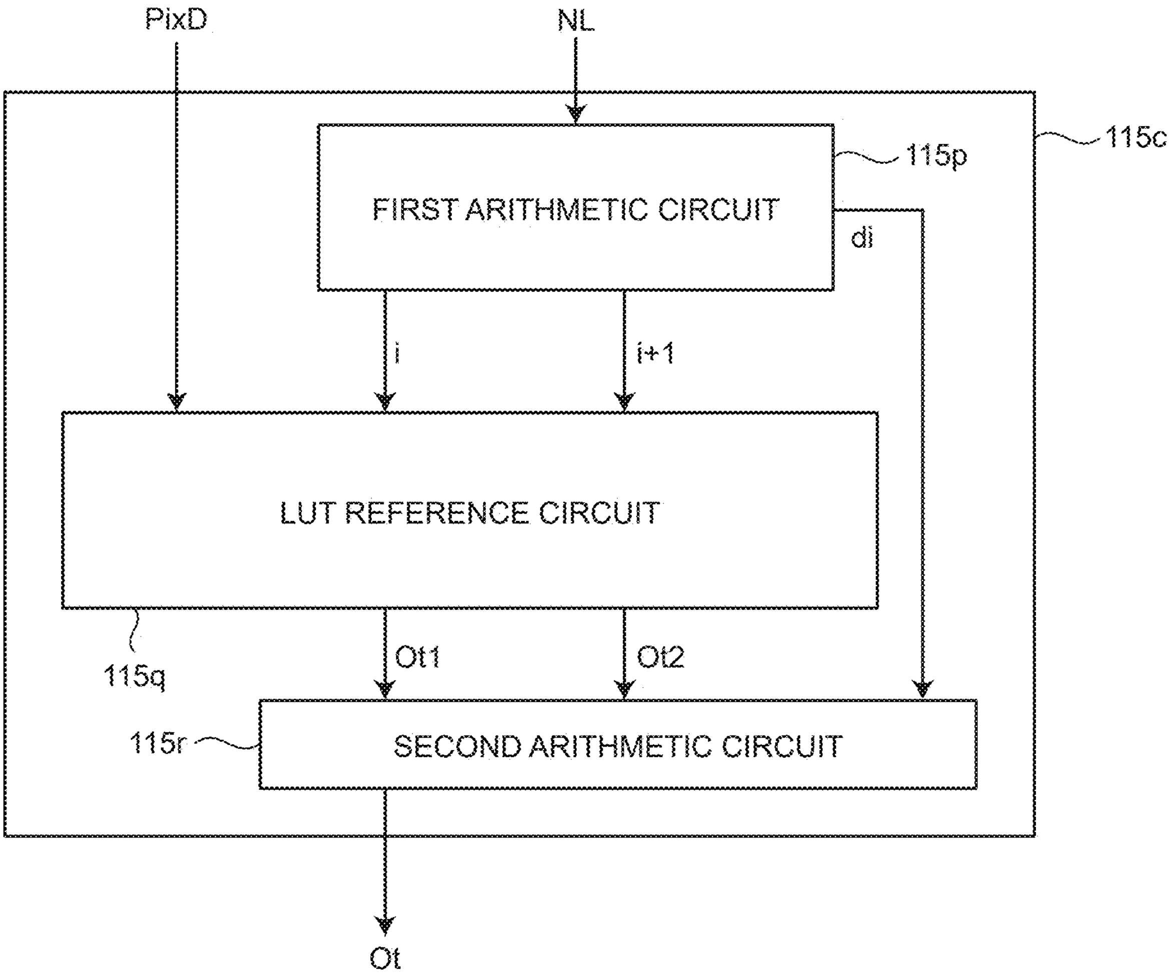
FIG. 18 is a block diagram of the main functional configuration of a gradation adjustment circuit 115*c;*
Figure 19:
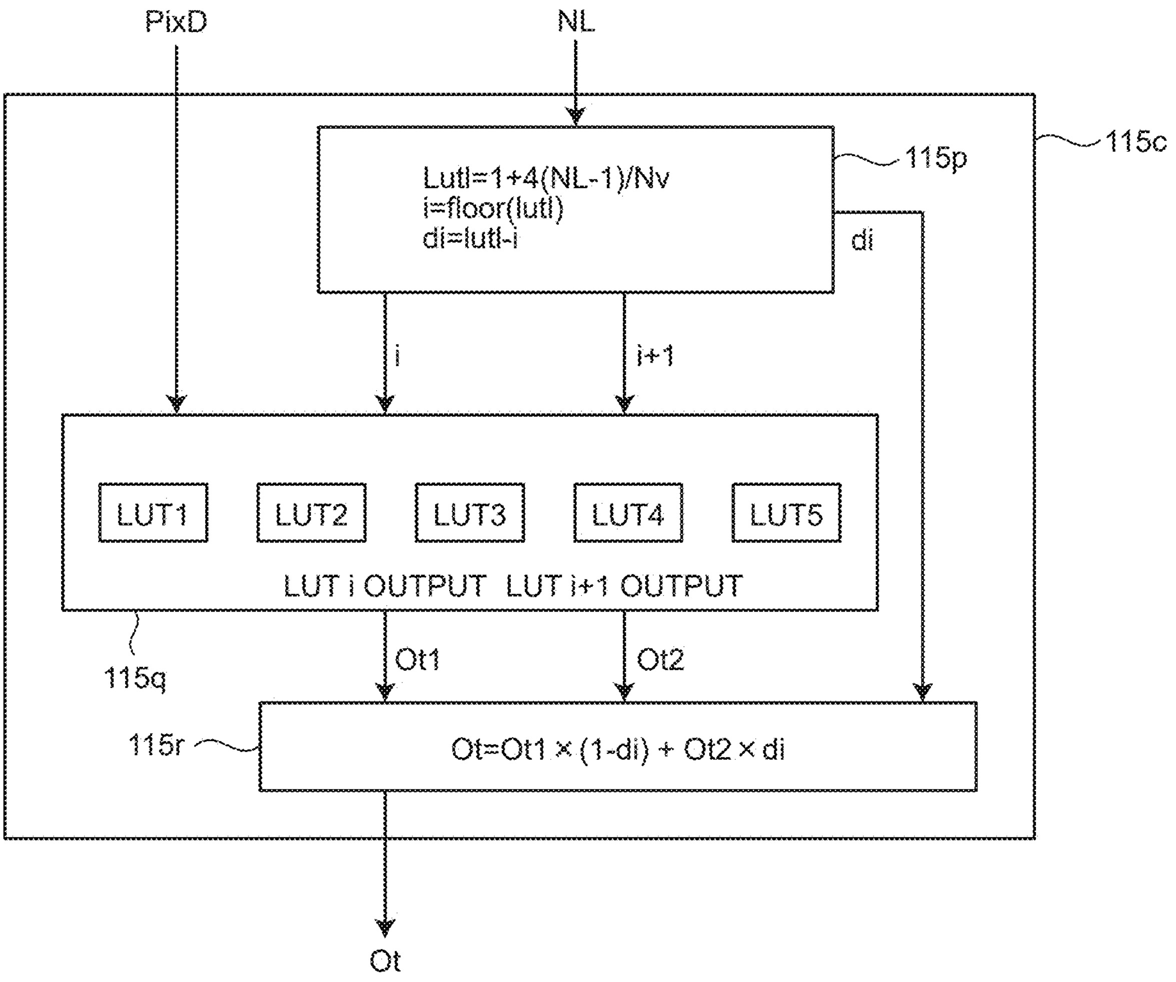
FIG. 19 is a block diagram of the processing performed by each component of the gradation adjustment circuit 115*c* illustrated in FIG. 18.

The following describes the driver IC 115 having a mechanism that performs processing of generating the pixel signal subjected to overdrive based on the input image data and also performs interpolation, with reference to FIGS. 17 to 19.

FIG. 17 is a block diagram of input/output in the driver IC 115 and the main functional configuration included in the driver IC 115. As illustrated in FIG. 17, the driver IC 115 includes an I/F circuit 115*a*, a row counter 115*b*, a gradation adjustment circuit 115*c*, a DAC 115*d*, and a timing controller 115*e*. I/F stands for an interface. DAC stands for a digital analog converter.

In accordance with the input of image data DP3, the I/F circuit 115*a* generates the pixel data PixD, a row count signal, and an operation control signal for the timing controller. The pixel data PixD is pixel data included in the image data DP3. The image data includes a plurality of pixel data corresponding to the positions in a matrix (row-column configuration). An image is displayed by the display panel 110 by assigning the pixel signals corresponding to the plurality of pieces of pixel data to the respective pixels Pix. The gradation value indicated by the pixel data PixD indicates the gradation value as the "target gradation". The row count signal is a signal for identifying the pixel row of the pixel Pix to which the pixel data PixD is assigned. The row count signal is output every time the pixel row of the pixel Pix to which the pixel data PixD is assigned is shifted. The operation control signal for the timing controller is a signal for synchronously controlling the signal line coupling circuit 113 and the scanning line drive circuit 114 by the timing controller 115*e*.

The row counter 115*b* counts the row count signal and outputs a row number NL. The row number NL indicates the scanning line GL coupled to the pixel Pix to which the pixel data PixD is assigned. In other words, with the row number NL, the pixel row of the scanning line GL corresponding to the pixel row including the pixel Pix is identified.

For example, when the row count signal is supplied to the row counter 115*b* only once, the value of the row number NL is 1, which means that the scanning line GL coupled to the pixel Pix to which the pixel data PixD is assigned is the scanning line G1 illustrated in FIGS. 7 and 8. Here, assume a case where the number of scanning lines GL is Nv as illustrated in FIG. 7. When the row count signal is supplied to the row counter 115*b* Ny times, the value of the row number NL is Nv, and the scanning line GL coupled to the pixel Pix to which the pixel data PixD is assigned is identified as the scanning line GE illustrated in FIGS. 7 and 8. Similarly, when the row count signal is supplied to the row counter 115*b* {(¼)×Nv} times, the value of the row number NL is {(¼)×Nv}, and the scanning line GL coupled to the pixel Pix to which the pixel data PixD is assigned is identified as the scanning line GB illustrated in FIGS. 7 and 8. When the row count signal is supplied to the row counter 115*b* {(½)×Nv} times, the value of the row number NL is {(½)×Nv}, and the scanning line GL coupled to the pixel Pix to which the pixel data PixD is assigned is identified as the scanning line GC illustrated in FIGS. 7 and 8. When the row count signal is supplied to the row counter 115*b* {(¾)×Nv} times, the value of the row number NL is {(¾)×Nv}, and the scanning line GL coupled to the pixel Pix to which the pixel data PixD is assigned is identified as the scanning line GD illustrated in FIGS. 7 and 8.

When the row count signal is further supplied to the row counter 115*b* after the value of the row number NL reaches Nv, one frame period is completed, and the next frame period starts. In this case, the value of the row number NL is reset to an initial value STA. The initial value STA illustrated in FIG. 7 indicates 1.

The gradation adjustment circuit 115*c* generates a pixel signal Ot based on the pixel data PixD and the row number NL. The following described a more specific configuration of the gradation adjustment circuit 115*c* with reference to FIGS. 18 and 19.

FIG. 18 is a block diagram of the main functional configuration of the gradation adjustment circuit 115*c*. FIG. 19 is a block diagram of the processing performed by each component of the gradation adjustment circuit 115*c* illustrated in FIG. 18. The gradation adjustment circuit 115*c* includes a first arithmetic circuit (first arithmetic part) 115*p*, a LUT reference circuit (LUT reference part) 115*q*, and a second arithmetic circuit (second arithmetic part) 115*r*.

The first arithmetic circuit 115*p* calculates lut1 as expressed by the following Expression (1). Nv in Expression (1) is the number of scanning lines GL as described above. The minimum value of lut1 calculated by Expression (1) is lut1=1, which is calculated when NL=1. The maximum value of lut1 calculated by Expression (1) is lut1=1+{4×(Nv−1)/Nv}, which is calculated when NL=Nv, and is equal to or larger than 4 and smaller than 5.

$$lut1=1+\{4\times(NL-1)/Nv\} \quad (1)$$

The first arithmetic circuit 115*p* calculates i as expressed by the following Expression (2). The "floor ( )" in Expression (2) indicates an operation of dropping the fractional portion of the value in the parentheses. As described above, a possible lut1 calculated by Expression (1) is equal to or larger than 1 and smaller than 5. Therefore, i calculated by Expression (2) is 1, 2, 3, or 4.

$$i=\mathrm{floor}(lut1) \quad (2)$$

The first arithmetic circuit 115*p* calculates di as expressed by the following Expression (3). The value "di" is a value equal to or larger than 0 and smaller than 1. When lut1 is a natural number, lut1=i is satisfied, and di=0 is derived. When lut1 is not a natural number, di is a value larger than 0 and smaller than 1.

$$di=lut1-i \quad (3)$$

The first arithmetic circuit 115*p* outputs information indicating i calculated by Expressions (1) and (2) and information indicating (i+1) obtained by adding 1 to i to the LUT reference circuit 115*q*. The first arithmetic circuit 115*p* outputs information indicating di calculated by Expressions (1), (2), and (3) to the second arithmetic circuit 115*r*.

The LUT reference circuit 115*q* stores therein a plurality of lookup tables. The LUT reference circuit 115*q* illustrated in FIG. 19 stores therein five lookup tables LUT1, LUT2, LUT3, LUT4, and LUT5. The lookup table LUT1 is, for example, a LUT indicating the relation between the "target gradation" and the "writing gradation" that can be represented by the graph LC71 described with reference to FIG. 16. In other words, the lookup table LUT1 is the LUT for the pixel signals supplied to the pixels Pix in the pixel row that share the scanning line G1. The lookup table LUT2 is, for example, a LUT indicating the relation between the "target gradation" and the "writing gradation" that can be represented by the graph LC72 described with reference to FIG. 16. In other words, the lookup table LUT2 is the LUT for the pixel signals supplied to the pixels Pix in the pixel row that share the scanning line GB. The lookup table LUT3 is, for example, a LUT indicating the relation between the "target gradation" and the "writing gradation" that can be represented by the graph LC73 described with reference to FIG. 16. In other words, the lookup table LUT3 is the LUT for the pixel signals supplied to the pixels Pix in the pixel row that share the scanning line GC. The lookup table LUT4 is, for example, a LUT indicating the relation between the "target gradation" and the "writing gradation" that can be represented by the graph LC74 described with reference to FIG. 16. In other words, the lookup table LUT4 is the LUT for the pixel signals supplied to the pixels Pix in the pixel row that share the scanning line GD. The lookup table LUT5 is, for example, a LUT indicating the relation between the "target gradation" and the "writing gradation" that can be represented by the graph LC75 described with reference to FIG. 16. In other words, the lookup table LUT5 is the LUT for the pixel signals supplied to the pixels Pix in the pixel row that share the scanning line GE.

The LUT reference circuit 115*q* refers to a lookup table (LUTi) corresponding to i and a lookup table (LUTi+1) corresponding to (i+1) out of the lookup tables stored therein. For example, when i=1, the lookup table corresponding to i is the lookup table LUT1. In this case, the lookup table corresponding to (i+1) is the lookup table LUT2.

The LUT reference circuit 115*q* identifies the "writing gradation" when the gradation value indicated by the pixel data PixD is the "target gradation" in the lookup table (LUTi) corresponding to i and determines the value of the identified "writing gradation" to be a first candidate Ot1. The LUT reference circuit 115*q* identifies the "writing gradation" when the gradation value indicated by the pixel data PixD is the "target gradation" in the lookup table (LUTi+1) corresponding to (i+1) and determines the value of the identified "writing gradation" to be a second candidate Ot2. The LUT reference circuit 115*q* outputs information indicating the first candidate Ot1 and information indicating the second candidate Ot2 to the second arithmetic circuit 115*r*.

The second arithmetic circuit 115*r* calculates a pixel signal Ot based on the following Expression (4). The pixel signal Ot is a value that reflects the value of the "writing gradation" in overdrive performed on the pixel Pix, wherein the pixel Pix is included in the pixel row sharing the scanning line GL at the position indicated by the row number NL and is located at the position to which the pixel data PixD is supplied.

$$Ot=\{Ot1\times(1-di)\}+Ot2\times di \quad (4)$$

When di is 0, "Ot2×di" in the right side of Expression (4) is 0, and the pixel signal Ot is calculated only by "Ot1×(1−di)". Therefore, interpolation is not virtually performed in this case, and the value of the pixel signal Ot reflects the "writing gradation" when the gradation value indicated by the pixel data PixD is the "target gradation" in the lookup table (LUTi) corresponding to i.

In contrast to this, when di is not 0, the value of the pixel signal Ot reflects "Ot2×di" and "Ot1×(1-di)". In other words, the value of the pixel signal Ot in this case is a value derived by interpolation based on both the "writing gradation" derived from the lookup table (LUTi) corresponding to i and the "writing gradation" derived from the lookup table (LUTi+1) corresponding to (i+1).

As illustrated in FIG. 17, the gradation adjustment circuit 115*c* outputs the generated pixel signal Ot to the DAC 115*d*. The DAC 115*d* generates an analog electrical signal corresponding to the value indicated by the pixel signal Ot and outputs it to the signal line coupling circuit 113. The signal supplied to the signal line SL from the signal line coupling circuit 113 corresponding to the analog electrical signal serves as the pixel signal output in the second period P2. The pixel signal is a pixel signal that reflects the value of the "writing gradation" in overdrive.

The timing controller 115*e* controls the operations of the signal line coupling circuit 113 and the scanning line drive circuit 114 such that the timing at which the pixel signal corresponding to the pixel data PixD is supplied to the signal line SL synchronizes with the timing at which the gate signal is supplied to the scanning line GL of the row number NL corresponding to the pixel data PixD, according to the operation control signal for the timing controller supplied from the I/F circuit 115*a*. With this configuration, the pixel Pix can be driven by the pixel signal subjected to overdrive.

As described with reference to FIGS. 17 to 19, the driver IC 115 stores therein the lookup table (e.g., lookup tables LUT2, LUT3, LUT4, and LUT5) that indicates the relation between the gradation value (target gradation) indicated by the pixel data and the gradation value (writing gradation) of the pixel signal when overdrive is performed. The driver IC 115 refers to the lookup table and generates the pixel signal supplied to the pixel on which the overdrive is to be performed. The driver IC 115 stores therein a plurality of lookup tables (e.g., lookup tables LUT2, LUT3, LUT4, and LUT5), and the lookup tables correspond to the respective scanning lines (e.g., scanning lines GB, GC, GD, and GE) to which the gate signal is supplied at different timings in scanning.

In the description above with reference to FIGS. 16 to 19, the graphs LC71, LC72, LC73, LC74, and LC75 illustrated in FIG. 16 correspond to the lookup tables LUT1, LUT2, LUT3, LUT4, and LUT5 illustrated in FIG. 19, respectively. In other words, the lookup tables LUT1, LUT2, LUT3, LUT4, and LUT5 in the description are based on the assumption that the pixel signal indicating a gradation value of "255" is employed as the predetermined pixel signal. However, the predetermined pixel signal that can be employed in the embodiment is not limited to the pixel signal indicating a gradation value of "255".

Figure 20:
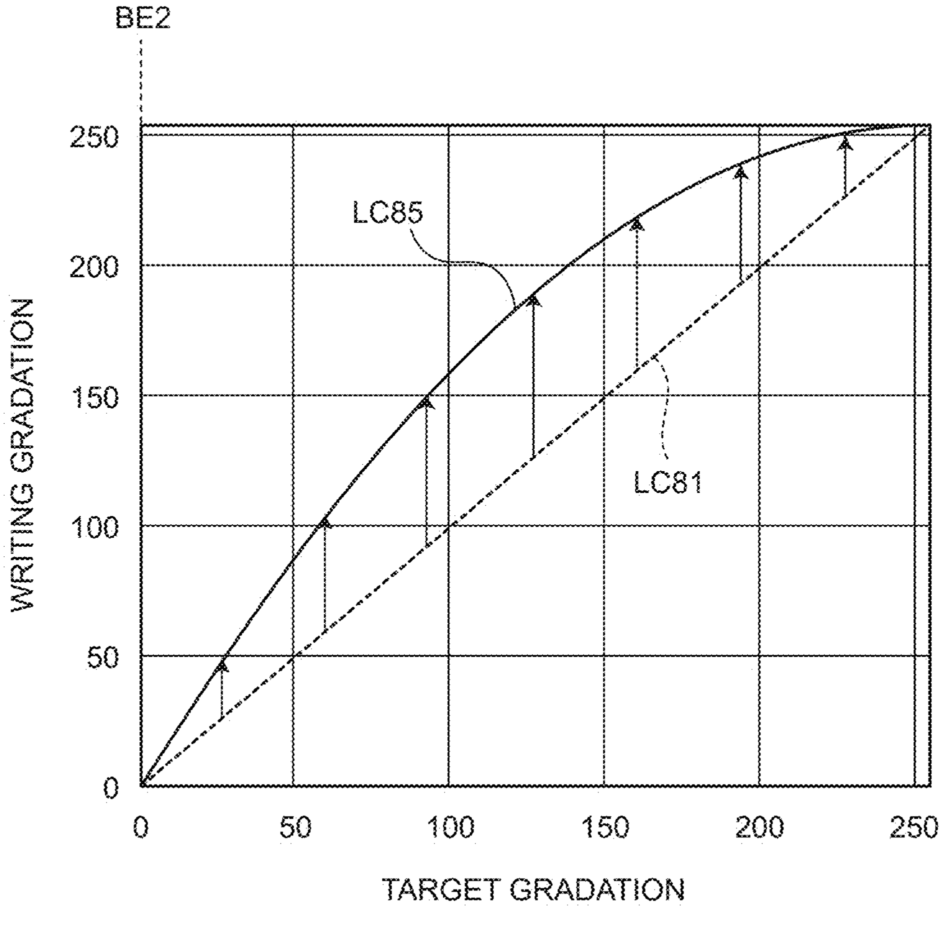
FIG. 20 is a graph of an example of the gradation value indicated by the pixel signal after the update, when overdrive is performed in a case where the pixel Pix is driven at the lowest luminance before the update of the pixel signal.

FIG. 20 is a graph of an example of the gradation value indicated by the pixel signal after the update, when overdrive is performed in a case where the pixel Pix is driven at the lowest luminance before the update of the pixel signal. In other words, FIG. 20 illustrates a case where a pixel signal indicating the lowest gradation value (0) is employed as the predetermined pixel signal. In the example illustrated in FIG. 20, a pixel signal indicating a gradation value of "0" is employed as the predetermined pixel signal. A predetermined gradation value BE2 in FIG. 20 is provided to indicate a gradation value of "0" as the predetermined pixel signal.

If the response of the pixel Pix is surely in time without performing overdrive, the "target gradation" and the "writing gradation" may be identical. Therefore, in this case, the relation between the "target gradation" and the "writing gradation" is represented by a graph LC81 in FIG. 20.

In the overdrive when the pixel signal indicating a gradation value of "0" is employed as the predetermined pixel signal, the pixel Pix is driven to produce the lowest luminance in the first period P1. As a result, the pixel signal supplied in the second period P2 is a pixel signal that drives the pixel Pix to produce the luminance equal to or higher than that before the update. Therefore, the overdrive in this case is performed such that the "writing gradation" is equal to or higher than the "target gradation" as in the relation between the luminance LU2 and the luminance LU21 in FIG. 11. Specifically, the pixel signal after the update is determined such that the "writing gradation" exceeds the "target gradation" except for gradation values of "0" and "255" as indicated by a graph LC85 in FIG. 20, for example. By setting the predetermined gradation value for the resetting illustrated in FIG. 20 to 0 or a gradation value close to 0, it can be secured that the transmittance of the liquid crystal reaches the lowest transmittance intended by a gradation of 0 in the limited response time T2. The example illustrated in FIG. 20 is a preferable example to achieve a higher contrast because a gradation value of 0 cannot be set to any further lower gradation by overdrive to shorten the response. The degree of light transmission at the pixel (e.g., the pixel PixR, the pixel PixG, and the pixel PixB) supplied with the pixel signal corresponding to the gradation value "0" is the lowest. Assume that the lowest degree of the light transmission is defined as 0% and the highest degree of the light transmission is defined as 100%. In this case, when the predetermined gradation value is set to a gradation value at which the degree of light transmission at the pixel is lower than 108, the response of the pixel can be more likely to be secured. This is because the response time of the pixel tends to be logarithmic with respect to changes in transmittance. Typically, the contrast of liquid crystal displays is approximately 1000:1, and the degree of light transmission at the pixel having the lowest transmittance is approximately 0.18. The time required for the degree of light transmission to transition between 0.1% and 1%, the time required for the degree of light transmission to transition between 1% and 10%, and the time required for the degree of light transmission to transition between 10% and 100%, are substantially equal. The time required for the transition to 0.1% out of these times is more important in terms of securing the contrast of the liquid crystal display. Therefore, it can be said that the response of the pixel can be more likely to be secured by setting the predetermined gradation value to a gradation value at which the degree of light transmission at the pixel is lower than 10%.

Figure 21:
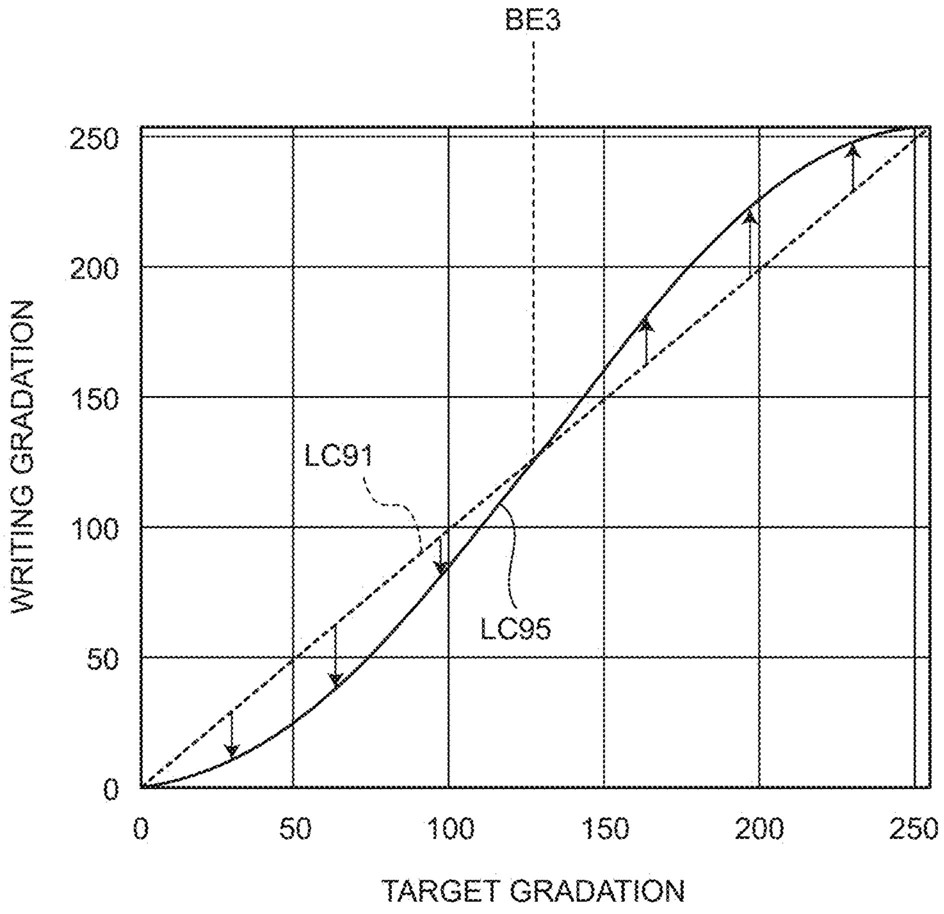
FIG. 21 is a graph of an example of the gradation value indicated by the pixel signal after the update, when overdrive is performed in a case where the pixel Pix is driven at an intermediate gradation between the lowest luminance and the highest luminance before the update of the pixel signal.

FIG. 21 is a graph of an example of the gradation value indicated by the pixel signal after the update, when overdrive is performed in a case where the pixel Pix is driven at an intermediate gradation between the lowest luminance and the highest luminance before the update of the pixel signal. FIG. 21 illustrates a case where a pixel signal indicating a value of "127" in an 8-bit signal the maximum value of which is 255, for example, is employed as the predetermined pixel signal. A predetermined gradation value BE3 in FIG. 21 is provided to indicate the gradation value as the predetermined pixel signal.

If the response of the pixel Pix is surely in time without performing overdrive, the "target gradation" and the "writing gradation" may be identical. Therefore, in this case, the relation between the "target gradation" and the "writing gradation" is represented by a graph LC91 in FIG. 21.

In the overdrive when the pixel signal indicating a gradation value of "127" is employed as the predetermined pixel signal, the pixel Pix is driven to produce the luminance corresponding to the middle gradation within the first period P1. Therefore, the relation between the "target gradation" and the "writing gradation" of the pixel signal supplied in the second period P2 changes depending on whether the pixel data PixD exceeds or is below a gradation value of "127". If the pixel data PixD exceeds a gradation value of "127", the pixel signal supplied in the second period P2 according to the pixel data PixD is a pixel signal that drives the pixel Pix to produce the luminance higher than that before the update. If the pixel data PixD is below a gradation value of "127", the pixel signal supplied in the second period P2 according to the pixel data PixD is a pixel signal that drives the pixel Pix to produce the luminance lower than that before the update. If the pixel data PixD has a gradation value of "127", there is no need to perform overdrive in the first place. Therefore, if the pixel data PixD has a gradation value of "127", the pixel signal is a pixel signal corresponding to a gradation value of "127". Therefore, the overdrive in this case is performed such that the "writing gradation" is equal to or lower than the "target gradation" as in the relation between the luminance LU2 and the luminance LU22 in FIG. 11 in the range where the "target gradation" is equal to or lower than "127", and that the "writing gradation" is equal to or higher than the "target gradation" as in the relation between the luminance LU2 and the luminance LU21 in FIG. 11 in the range where the "target gradation" is equal to or higher than "127". Specifically, the pixel signal after the update is determined as indicated by a graph LC95 in FIG. 21, for example.

FIGS. 20 and 21 each illustrate only one type of graph for the execution of overdrive. Also when the predetermined pixel signal described with reference to FIGS. 20 and 21 is employed, overdrive may be performed according to the second response time T2 for each pixel row, considering that the timing at which the pixel signal is supplied to the pixel Pix and the second response time T2 differ between the pixel rows in scanning as described with reference to FIGS. 16 to 19. In other words, the lookup tables LUT1, LUT2, LUT3, LUT4, and LUT5 described with reference to FIG. 19 simply need to be set based on the predetermined pixel signal. The following describes, with reference to FIGS. 22 to 27, a more detailed example of the case where the pixel signal indicating a gradation value of "0" is employed as the predetermined pixel signal as illustrated in FIG. 20.

FIG. 22 is a diagram of an example of the contents of the lookup tables LUT1, LUT2, LUT3, LUT4, and LUT5 when the pixel signal indicating a gradation value of "0" is employed as the predetermined pixel signal. "L in" in FIGS. 22 and 27 corresponds to the "target gradation". "L out" in FIGS. 22 and 27 corresponds to the "writing gradation" of the lookup tables LUT1, LUT2, LUT3, LUT4, and LUT5.

Figure 23:
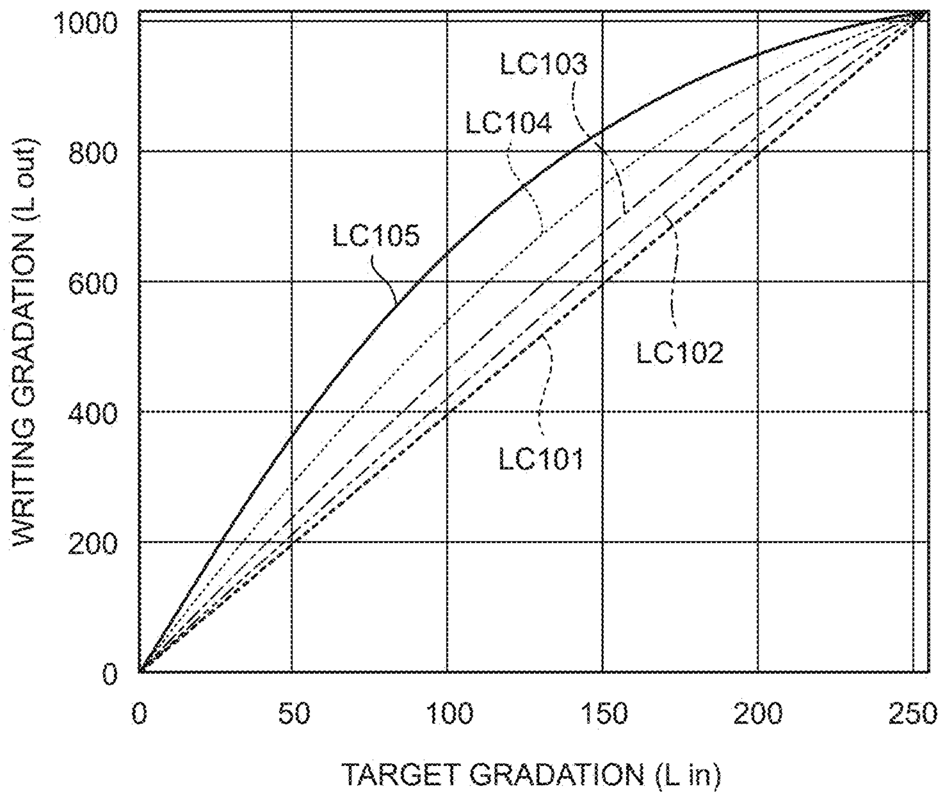
FIG. 23 is a graph indicating the lookup tables LUT1, LUT2, LUT3, LUT4, and LUT5 illustrated in FIG. 22.

FIG. 23 is a graph indicating the lookup tables LUT1, LUT2, LUT3, LUT4, and LUT5 illustrated in FIG. 22. A graph LC101 illustrated in FIG. 23 is obtained by graphing the lookup table LUT1 illustrated in FIG. 22. A graph LC102 illustrated in FIG. 23 is obtained by graphing the lookup table LUT2 illustrated in FIG. 22. A graph LC103 illustrated in FIG. 23 is obtained by graphing the lookup table LUT3 illustrated in FIG. 22. A graph LC104 illustrated in FIG. 23 is obtained by graphing the lookup table LUT4 illustrated in FIG. 22. A graph LC105 illustrated in FIG. 23 is obtained by graphing the lookup table LUT5 illustrated in FIG. 22.

In the example illustrated in FIGS. 22 and 23, the number of bits of the "writing gradation" is expanded with respect to the number of bits of the "target gradation" unlike the example described with reference to FIG. 16. Specifically, in the example illustrated in FIGS. 22 and 23, the number of bits of the "writing gradation" is 10 bits, and the "writing gradation" can be any value ranging from 0 to 1023. The number of bits of the "target gradation" in the example illustrated in FIGS. 22 and 23 is 8 bits as in the example described with reference to FIG. 16. In other words, in the example illustrated in FIGS. 22 and 23, the number of bits is expanded to perform overdrive for deriving the "writing gradation" from the "target gradation". In the following description, expanding the number of bits refers to expanding the number of bits of the "writing gradation" with respect to the number of bits of the "target gradation".

FIG. 24 is a diagram of "L out" in the range where "L in" is equal to or larger than 245 when the number of bits is not expanded. As illustrated in FIG. 24, if the number of bits is not expanded, the execution of overdrive may result in loss of the difference in apparent gradation value. In the lookup table LUT5 in the example illustrated in FIG. 24, for example, the values of "L out" corresponding to "L in" in the range from 245 to 247 are set to the same value "253". In the lookup table LUT5, the values of "L out" corresponding to "L in" in the range from 248 to 251 are set to the same value "254". In the lookup table LUT5, the values of "L out"

corresponding to "L in" in the range from 252 to 255 are set to the same value "255". These equalized "L out" values may cause gradation collapse in the displayed output image when a delay in response or the like described with reference to FIG. 12 occurs. In the example illustrated in FIG. 24, the values of "L out" are also equalized in the lookup tables LUTZ, LUT3, and LUT4 other than the lookup table LUT5, although not as significant as the lookup table LUT5.

FIG. 25 is a diagram of "L out" in the range where "L in" is equal to or larger than 245 when the number of bits is expanded. As illustrated in FIGS. 22, 23, and 25, expanding the number of bits can prevent "L out" from being equalized in each lookup table. In other words, expanding the number of bits facilitates reducing or preventing the equalization of the apparent gradation values described with reference to FIG. 24, and thereby reducing the probability of the occurrence of gradation collapse due to the equalization.

In the example illustrated in FIGS. 22, 23 and 25, there is no equalization in "L out" already. However, if the equalization of "L out" occurs after the number of bits is expanded, the relation between "L in" and "L out" may intentionally be shifted slightly, prior to employing the "writing gradation" corresponding to the "target gradation" ideal for overdrive, whereby the equalization of "L out" can be reduced.

Figure 26:
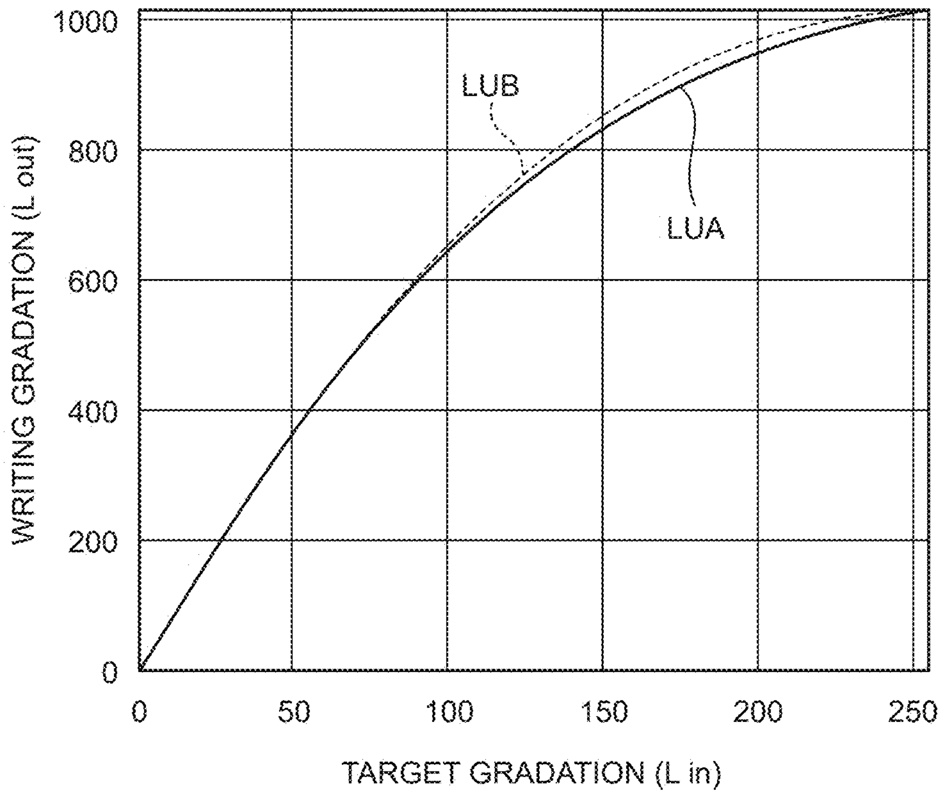
FIG. 26 is a graph of a lookup table that reflects the "writing gradation" corresponding to the "target gradation" ideal for overdrive, and a lookup table obtained by giving priority to reduction of the equalization of "L out"

FIG. 26 is a graph of a lookup table that reflects the "writing gradation" corresponding to the "target gradation" ideal for overdrive and a lookup table obtained by giving priority to the reduction of the equalization of "L out". A lookup table LUB illustrated in FIG. 26 indicates a lookup table that reflects the "writing gradation" corresponding to the "target gradation" ideal for overdrive. A lookup table LUA indicates a lookup table obtained by giving priority to the reduction of the equalization of "L out".

FIG. 27 is a diagram of "L out" in the range where "L in" is equal to or larger than 240 in the relation between "L in" and "L out" in the lookup tables LUA and LUB illustrated in FIG. 26. As illustrated in FIG. 27, in the lookup table LUB, the values of "L out" corresponding to "L in" of 240 and 241 are set to the same value "1020". In the lookup table LUB, the values of "L out" corresponding to "L in" in the range from 242 to 245 are set to the same value "1021". In the lookup table LUB, the values of "L out" corresponding to "L in" in the range from 246 to 254 are set to the same value "1022". Instead of the lookup table LUB, a lookup table in which the values of "L out" are intentionally made different, such as the lookup table LUA, may be employed. The use of such a lookup table can more reliably reduce the equalization of the apparent gradation values described with reference to FIG. 24 and reduce the probability of the occurrence of gradation collapse due to the equalization.

In the LUTs described with reference to FIGS. 22, 23, 25, 26, and 27, the number of bits of the gradation value (L out) of the pixel signal is larger than that of the gradation value (L_in) indicated by the pixel data. The gradation value (L out) of the pixel signal in the LUTs described with reference to FIGS. 22, 23, and 27 differs when the gradation value (L in) indicated by the pixel data differs.

As described above, the display device according to the embodiment includes a plurality of pixels (pixel Pix including the pixel PixR, the pixel PixG, and the pixel PixB), a plurality of scanning line (scanning lines GL), a plurality of signal lines (signal lines SL), a first circuit (scanning line drive circuit 114), a second circuit (signal line coupling circuit 113), and a third circuit (driver IC 115). The scanning line is coupled to the pixels arrayed along the first direction (X-direction). The signal line is coupled to the pixels arrayed along a second direction (Y-direction) intersecting the first direction. The first circuit supplies a gate signal to each of the scanning lines. The second circuit supplies a pixel signal to each of the signal lines. The third circuit generates the pixel signal according to image data. The pixel is supplied with the pixel signal in response to the timing of driving a switching element (switching elements TrD1, TrD2, and TrD3) driven in accordance with the gate signal and is reset by a reset signal corresponding to a predetermined gradation value before the pixel signal is supplied. The first circuit performs scanning in which the timing of supplying the gate signal differs between the scanning lines when the pixel signal is supplied to each pixel. The third circuit performs overdrive on some or all of the pixels. The overdrive is processing of using the difference between the gradation value indicated by pixel data included in the image data and the predetermined gradation value as a reference value and generating the pixel signal corresponding to a gradation value the difference of which from the predetermined gradation value is larger than the reference value. The magnitude of the difference between the gradation value of the pixel signal generated by the overdrive and the predetermined gradation value is larger for the pixel signal supplied to the pixel coupled to the scanning line supplied with the gate signal at a later timing in the scanning.

This configuration does not require an extra component, such as the one screen frame memory 1152 described with reference to FIG. 13, thereby enabling overdrive at a lower cost. The resetting by the reset signal is performed before supplying the pixel signal to the pixel to perform display output corresponding to the image data. As a result, "previous information (gradation value) of the pixel" required to generate the pixel signal for performing overdrive can be set to the same gradation value of the reset signal. Therefore, this configuration can perform overdrive with a mechanism simpler than a complex mechanism in which the "previous information (gradation value) of the pixel" fluctuates depending on the previous image.

The third circuit (driver IC 115) stores therein a lookup table (e.g., lookup tables LUT2, LUT3, LUT4, and LUT5) that indicates the relation between the gradation value that is indicated by the pixel data and the gradation value of the pixel signal when the overdrive is performed. The third circuit refers to the lookup table and generates the pixel signal to be supplied to the pixel on which the overdrive is to be performed, whereby the overdrive can be performed with a simpler mechanism.

The third circuit (driver IC 115) stores therein a plurality of lookup tables (e.g., lookup tables LUT2, LUT3, LUT4, and LUT5), and the lookup tables correspond to, among the scanning lines, scanning lines (e.g., scanning lines GB, GC, GD, and GE) to which the gate signal is supplied at different timings in scanning. Thus, the third circuit can perform the overdrive with higher accuracy according to the timing of supplying the gate signal in the scanning.

As described with reference to FIG. 22 and other figures, the number of bits of the gradation value of the pixel signal in the lookup table is larger than the number of bits of the gradation value indicated by the pixel data. This configuration facilitates reducing or preventing the occurrence of gradation collapse.

As described with reference to FIGS. 22 and 27, the gradation value of the pixel signal in the lookup table differs when the gradation value indicated by the pixel data differs. This configuration can more reliably reduce or prevent the occurrence of gradation collapse.

HMDs designed to display and output VR images like the embodiment tend to be required to achieve faster response of the display region 111. For this tendency, the embodiment can achieve a response speed sufficiently fast to meet the demand by performing overdrive.

Figure 28:
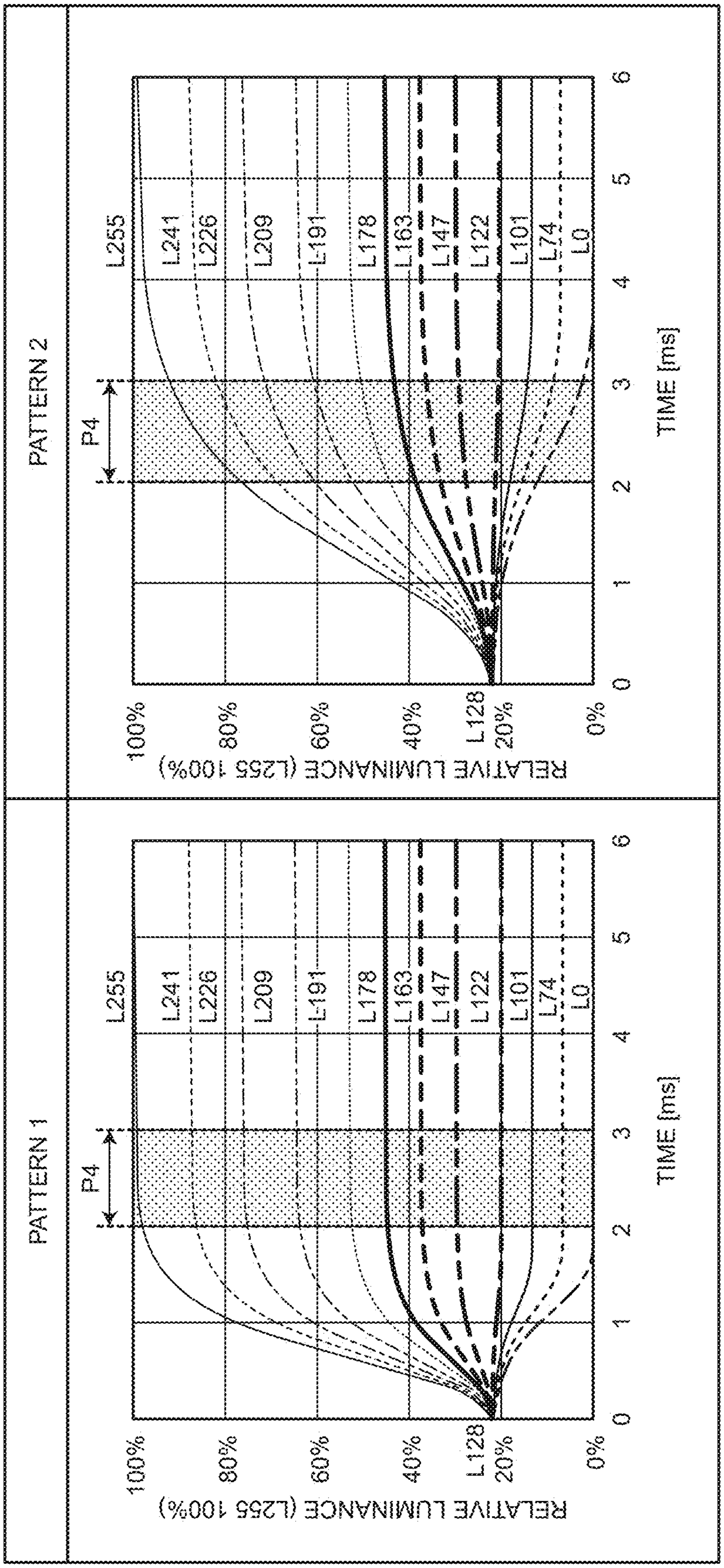
FIG. 28 is a graph of an example of response when resetting by an intermediate gradation is performed.

In the resetting by the highest gradation (e.g., 255) as described with reference to FIG. 16, all the pixels uniformly perform output with a gradation value higher than the intended gradation value even if a delay in response as described with reference to FIG. 12 occurs. In the resetting by the lowest gradation (e.g., 0) as described with reference to FIG. 20, all the pixels uniformly perform output with a gradation value lower than the intended gradation value even if a delay in response as described with reference to FIG. 12 occurs. In the resetting by an intermediate gradation as described with reference to FIG. 21, when a gradation higher than the gradation for the resetting is compared with a gradation lower than the gradation for the resetting, the gradation difference due to overdrive is represented in opposite directions (it is brighter when the gradation is higher than the gradation for the resetting and darker when the gradation is lower than the gradation for the resetting). As a result, the luminance differences due to overdrive in different directions are not mixed even if a delay or advance in response occurs. Therefore, the variations in luminance can be reduced. FIG. 28 is a graph of an example of response when the resetting by the intermediate gradation is performed. Pattern 1 indicates an example where the response is in time for the fourth period P4. Pattern 2 indicates an example where the response is not in time for the fourth period P4. As indicated by Pattern 2, the luminance differences due to overdrive in different directions are not mixed even if a delay or advance in response occurs.

The number of lookup tables referred to for overdrive is not limited to five as illustrated in FIG. 19 and other figures and simply needs to be two or more. The value of "4" in Expression (1) is a value obtained by subtracting 1 from the value (5) indicating the total number of five LUTs, that is, the lookup tables LUT1, LUT2, LUT3, LUT4, and LUT5. Therefore, when the number of employed LUTs is n, "4" in Expression (1) is replaced by (n−1).

Two or more of the first circuit, the second circuit, and the third circuit may be packaged into one circuit. For example, a circuit may be provided by integrating two or more of the functions of the signal line coupling circuit 113, the scanning line drive circuit 114, and the driver IC 115 described above. In other words, the first circuit, the second circuit, and the third circuit are not necessarily physically independent of each other.

The embodiment assumes that an HMD is for VR images, but the use of the display device according to the present disclosure is not limited thereto. For example, the display device according to the present disclosure may be a display device that displays and outputs a single image using a single display panel 110.

The pixel row including the pixel Pix on which overdrive is to be performed can be appropriately changed according to various factors, such as the required response speed and the response characteristics of the display panel. For example, the LUT may be determined such that overdrive is performed on all the pixels Pix including the scanning line G1. Alternatively, when the response is surely in time without performing the overdrive on the scanning lines from the scanning line G1 to the scanning line GB, the scanning line GC, or other scanning lines, overdrive may be performed on the pixels Pix in the scanning line GC and the subsequent scanning lines. In any case, in overdrive, the second difference described above tends to be larger with respect to the first difference for the pixel signal supplied to the pixel Pix coupled to the scanning line GL supplied with the gate signal at a later timing in scanning.

Out of other advantageous effects achieved by the aspects described in the present embodiment, advantageous effects clearly defined by the description in the present specification or appropriately conceivable by those skilled in the art are naturally achieved by the present disclosure.

What is claimed is:

1. A display device comprising:
a plurality of pixels;
a plurality of scanning lines each of which is coupled to more than one of the pixels arrayed along a first direction;
a plurality of signal lines each of which is coupled to more than one of the pixels arrayed along a second direction intersecting the first direction;
a first circuit configured to supply a gate signal to each of the scanning lines;
a second circuit configured to supply a pixel signal to each of the signal lines; and
a third circuit configured to generate the pixel signal according to image data, wherein
each pixel is configured to be supplied with the pixel signal in response to a timing of driving a switching element driven in accordance with the gate signal,
each pixel is configured to be reset by a reset signal corresponding to a predetermined gradation value before the pixel signal is supplied,
the first circuit is configured to perform scanning in which a timing of supplying the gate signal differs between the scanning lines when the pixel signal is supplied to each pixel,
the third circuit is configured to perform overdrive on some or all of the pixels,
the overdrive is processing of
using a difference between a gradation value indicated by pixel data included in the image data and the predetermined gradation value as a reference value and
generating the pixel signal corresponding to the gradation value the difference of which from the predetermined gradation value is larger than the reference value, and
a magnitude of the difference between the gradation value of the pixel signal generated by the overdrive and the predetermined gradation value is larger for the pixel signal supplied to the pixel coupled to the scanning line supplied with the gate signal at a later timing in the scanning.

2. The display device according to claim 1, wherein
the third circuit is configured to store therein a lookup table that indicates a relation between the gradation value that is indicated by the pixel data and the gradation value of the pixel signal when the overdrive is performed, and
the third circuit is configured to refer to the lookup table and generate the pixel signal to be supplied to the pixel on which the overdrive is to be performed.

3. The display device according to claim 2, wherein
the third circuit is configured to store therein a plurality of the lookup tables, and
the lookup tables correspond to, among the scanning lines, scanning lines to which the gate signal is supplied at different timings in the scanning.

4. The display device according to claim 3, wherein the number of bits of the gradation value of the pixel signal in the lookup table is larger than the number of bits of the gradation value indicated by the pixel data.

5. The display device according to claim 4, wherein the gradation value of the pixel signal in the lookup table differs when the gradation value indicated by the pixel data differs.

6. The display device according to claim 1, wherein the predetermined gradation value is a gradation value at which the degree of light transmission at the pixel is lower than 10%.

* * * * *